(12) United States Patent
Gunda et al.

(10) Patent No.: US 11,321,093 B1
(45) Date of Patent: May 3, 2022

(54) MULTILAYERED GENERATION AND PROCESSING OF COMPUTER INSTRUCTIONS

(71) Applicant: People Center, Inc., San Francisco, CA (US)

(72) Inventors: Siddhartha Gunda, Milpitas, CA (US); Sanket Ketkar, Karnataka (IN); Kyle Michael Boston, San Carlos, CA (US); Yu Dong, San Francisco, CA (US); Parker Rouse Conrad, San Francisco, CA (US)

(73) Assignee: PEOPLE CENTER, INC., San Francisco, CA (US)

( * ) Notice: Subject to any disclaimer, the term of this patent is extended or adjusted under 35 U.S.C. 154(b) by 0 days.

(21) Appl. No.: 17/365,679

(22) Filed: Jul. 1, 2021

(51) Int. Cl.
*G06F 16/28* (2019.01)
*G06F 16/245* (2019.01)
(Continued)

(52) U.S. Cl.
CPC .............. *G06F 9/3017* (2013.01); *G06F 8/51* (2013.01); *G06F 16/2448* (2019.01);
(Continued)

(58) Field of Classification Search
CPC ........ G06F 9/3017; G06F 9/4493; G06F 8/51; G06F 16/2448; G06F 16/9024;
(Continued)

(56) References Cited

U.S. PATENT DOCUMENTS

| 9,348,880 | B1 * | 5/2016 | Kramer | ................. G06F 16/258 |
| 2007/0027905 | A1 * | 2/2007 | Warren | ..................... G06F 8/51 |

(Continued)

OTHER PUBLICATIONS

Michael Armbrust et al., Spark SQL: Relational Data Processing in Spark, May 2015, [Retrieved on Feb. 8, 2022], Retrieved from the internet: <URL: https://dl.acm.org/doi/abs/10.1145/2723372.2742797> 12 Pages (1383-1394) (Year: 2015).*

(Continued)

*Primary Examiner* — Anibal Rivera
(74) *Attorney, Agent, or Firm* — Dority & Manning, P.A.

(57) ABSTRACT

Systems, devices, computer-implemented methods, and tangible non-transitory computer readable media for performing multilayered generation and processing of computer instructions are provided. For example, a computing device may receive a request with instructions in a first computer language, parse the instructions in the first computer language, analyze the instructions in the first computer language in view of information describing structure of a first application, generate instructions in a second computer language different from the first computer language where the instructions in the second computer language are generated based on the instructions in the first computer language and the information describing structure of the first application, obtain a result from a second application where the result comprises information based on the instructions in the second computing language, and provide the result in response to the request comprising the instructions in the first computer language.

18 Claims, 6 Drawing Sheets

(51) Int. Cl.
*G06F 9/30* (2018.01)
*G06F 8/51* (2018.01)
*G06F 16/901* (2019.01)
*G06F 16/242* (2019.01)
*G06F 16/22* (2019.01)
*G06F 16/23* (2019.01)
*G06F 16/26* (2019.01)
*G06F 16/2455* (2019.01)
*G06F 16/35* (2019.01)

(52) U.S. Cl.
CPC ........ *G06F 16/9024* (2019.01); *G06F 16/221* (2019.01); *G06F 16/2228* (2019.01); *G06F 16/2264* (2019.01); *G06F 16/2282* (2019.01); *G06F 16/2379* (2019.01); *G06F 16/24564* (2019.01); *G06F 16/26* (2019.01); *G06F 16/288* (2019.01); *G06F 16/289* (2019.01); *G06F 16/355* (2019.01)

(58) Field of Classification Search
CPC ...... G06F 16/252; G06F 16/283; G06F 16/28; G06F 16/25; G06F 16/245; G06F 16/2433; G06F 16/9535; G06F 16/254; G06F 16/24544; G06F 16/24547; G06F 16/2471; G06F 16/24537; G06F 16/2423; G06F 16/24524; G06F 16/289; G06F 16/26; G06F 16/2282; G06F 16/2888; G06F 16/22; G06F 16/221; G06F 16/2228; G06F 16/2264; G06F 16/246; G06F 16/2379; G06F 16/24564; G06F 16/2477; G06F 16/355; G06F 16/258; G06F 16/211; G06F 16/90335
See application file for complete search history.

(56) References Cited

U.S. PATENT DOCUMENTS

| | | | |
|---|---|---|---|
| 2010/0082646 A1* | 4/2010 | Meek | G06F 16/252 707/752 |
| 2014/0032588 A1* | 1/2014 | Getmanets | G06F 16/283 707/760 |
| 2019/0034482 A1* | 1/2019 | Werner | G06F 16/2433 |

OTHER PUBLICATIONS

Alekh Jindal et al., GRAPHiQL: A Graph Intuitive Query Language for Relational Databases, 2014 IEEE [Retrieved on Feb. 8, 2022]. Retrieved from the internet: <URL: https://ieeexplore.ieee.org/stamp/stamp.jsp?tp=&arnumber=7004261> 10 Pages (441-450) (Year: 2014).*

* cited by examiner

MULTILAYERED GENERATION AND PROCESSING OF COMPUTER INSTRUCTIONS

FIELD

The present disclosure generally relates to computer systems. More particularly, the present disclosure relates to automated generation and processing of computer source code or other instructions for execution by computer systems, computer applications, or internet services.

BACKGROUND

A computer program is a collection of instructions that can be executed by a computer device to perform one or more tasks. Computer programs usually are written by a computer programmer (i.e., software developer, programmer, coder, etc.) having specialized knowledge of one or more highly complex computer programming languages (e.g., Java, C, C++). For example, a computer programmer may enter human-readable source code in a source code editor or integrated development environment (IDE). A compiler program then transforms (i.e., "compiles") the source code into a lower-level machine-readable language, such as assembly language or machine code, for execution by a computer device. Some compilers generally may compile source code into an intermediate language for execution by an interpreter computer program of a runtime environment.

Most users lack the specialized knowledge, experience, and skills needed to write computer programs in a programming language. This usually prevents most non-programmers from developing and performing their own custom operations associated with organizational data and other types of information stored in computer systems. As such, most users generally are restricted to the applications and interfaces provided by computer programs written by computer programmers. Therefore, a need exists for providing tools that empower users with the ability to access, query, obtain, and/or perform other operations with organizational data and other types of information available in computer systems.

SUMMARY

Aspects and advantages of embodiments of the present disclosure will be set forth in part in the following description, or can be learned from the description, or can be learned through practice of the embodiments.

One example aspect of the present disclosure is directed to a computer system that implements an organizational management platform that controls and leverages organizational data to manage organizational applications for an organization. The computer system includes one or more processors. The computer system includes one or more databases that collectively store a set of organizational data associated with the organization, wherein the set of organizational data comprises an object graph data structure comprising a plurality of employee data objects that respectively correspond to a plurality of employees of the organization. The computer system includes one or more non-transitory computer-readable media that collectively store instructions that, when executed by the one or more processors, cause the computer system to perform operations. The operations include receiving a user-defined query expression that is expressed in a first computer language, wherein the first computer language is or includes a custom query language. The operations include incorporating the user-defined query expression into an automated data processing routine, wherein the automated data processing routine is or includes one or more of a report, policy, workflow, trigger, or rule from an application. The operations include implementing the automated data processing routine to modify at least one data object in the object graph data structure. Implementing the automated data processing routine comprises translating the user-defined query expression from the first computer language into a second computer language, wherein the second computer language is or includes a data access language.

Another example aspect of the present disclosure is directed to a computer-implemented method for performing multilayered generation and processing of computer instructions. For example, a computer-implemented method performed by one or more processors may include receiving a request comprising one or more instructions in a first computer language, parsing the one or more instructions in the first computer language in view of one or more rules associated with the first computer language, analyzing the one or more instructions in the first computer language in view of information describing structure of a first application, generating one or more instructions in a second computer language different from the first computer language with the one or more instructions in the second computer language being generated based on the one or more instructions in the first computer language and the information describing structure of the first application, obtaining a result from a second application where the result comprises information based on the one or more instructions in the second computing language, and providing the result in response to the request comprising the one or more instructions in the first computer language.

Another example aspect of the present disclosure is directed to one or more tangible non-transitory computer-readable media storing computer-readable instructions that, when executed by one or more processors, cause the one or more processors of a computing system to perform operations. For example, the operations may include receiving a request comprising one or more instructions in a first computer language, parsing the one or more instructions in the first computer language in view of one or more rules associated with the first computer language, analyzing the one or more instructions in the first computer language in view of information describing structure of a first application, generating one or more instructions in a second computer language different from the first computer language with the one or more instructions in the second computer language being generated based on the one or more instructions in the first computer language and the information describing structure of the first application, obtaining a result from a second application where the result comprises information based on the one or more instructions in the second computing language, and providing the result in response to the request comprising the one or more instructions in the first computer language.

Another example aspect of the present disclosure is directed to a computing system having one or more processors that are communicatively coupled to one or more non-transitory computer-readable media with instructions that, when executed by the one or more processors, cause the one or more processors to perform operations. For example, the operations may include receiving a request comprising one or more instructions in a first computer language, parsing the one or more instructions in the first computer language in view of one or more rules associated with the first computer language, analyzing the one or more instructions in the first computer language in view of information describing structure of a first application, generating one or more instructions in a second computer language different from the first computer language with the one or more instructions in the second computer language being generated based on the one or more instructions in the first computer language and the information describing structure of the first application, obtaining a result from a second application, the result comprising information based on the one or more instructions in the second computing language, and providing, the result in response to the request comprising the one or more instructions in the first computer language.

Other aspects of the present disclosure are directed to various systems, apparatuses, non-transitory computer-readable media, user interfaces, and devices for providing multilayered generation and processing of computer instructions. These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
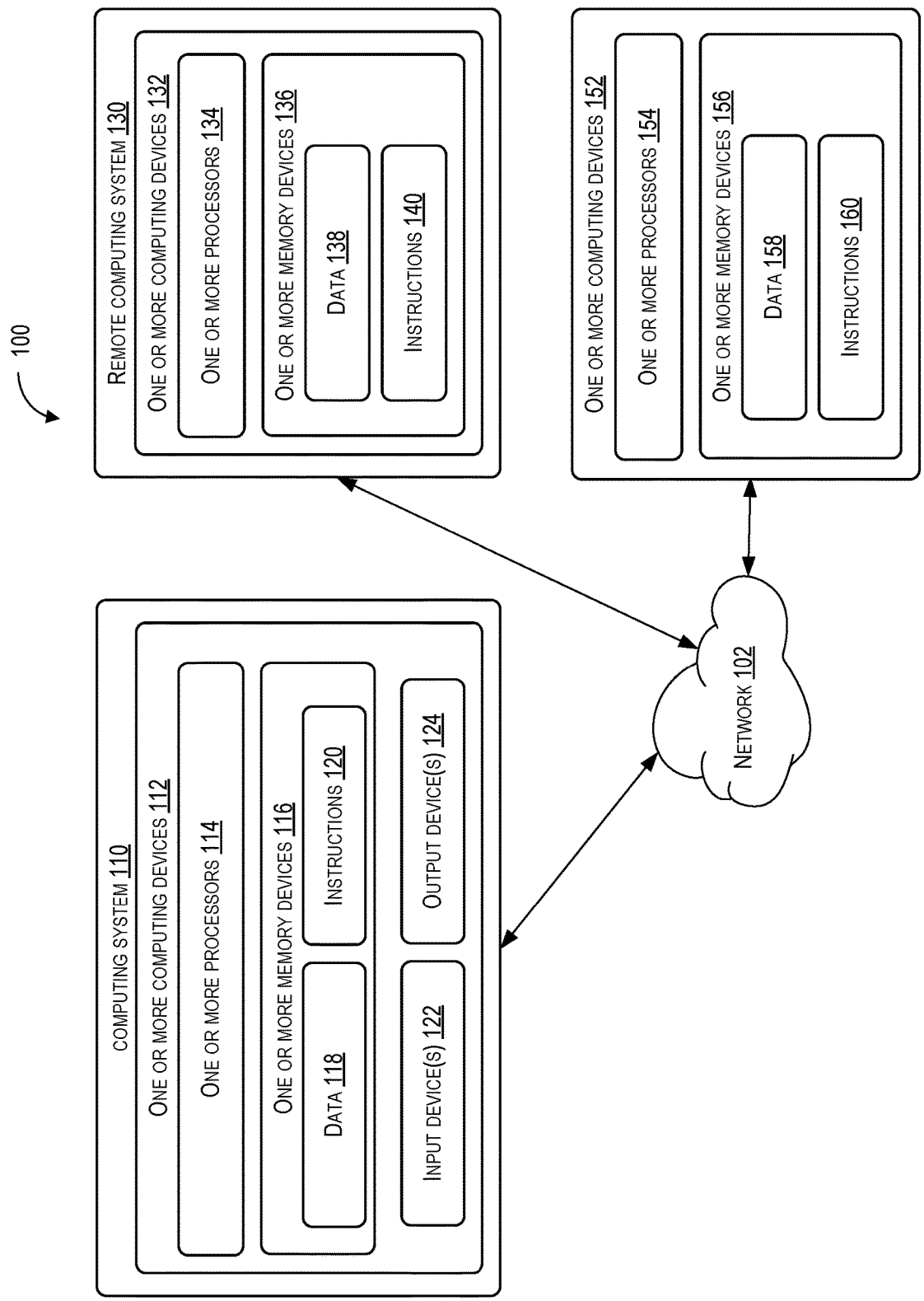
FIG. 1 depicts a block diagram of an example environment including a computing system that performs operations, according to example embodiments of the present disclosure.

Reference numerals that are repeated across plural figures are intended to identify the same features in various implementations.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a further embodiment. Thus, it is intended that aspects of the present disclosure cover such modifications and variations.

Generally, the present disclosure is directed to providing improved computer applications, computer systems, computer-implemented methods, user interfaces, and/or services for multilayered generation and processing of computer instructions. In particular, examples described in the present disclosure enable automated generation and processing of computer instructions based on statements provided in a custom computer language. As one example, a custom computer language may enable users to perform operations involving organizational data. For example, the custom computer language may allow users to query, interact with, and/or perform other various tasks associated with organizational data stored in an organizational data management system. In addition, statements provided in the custom computer language generally may be used to generate and process additional instructions that are executed in association with one or more different applications, computer systems, and/or data stores.

Organizations generally use many applications and systems to sustain operations. Such applications and systems generally rely on organizational data and processing that is tied to organizational data. In addition, such applications and systems usually are written by computer programmers in complex programming languages, utilize sophisticated data models with large numbers of entities and relationships (e.g., 1, 10, dozens, hundreds, thousands, etc.), and involve various types of proprietary technologies. However, most users that work with organizational data lack the specialized knowledge, experience, and skills to build and maintain applications and systems that utilize organizational data. In addition, every organization has resource limitations and many organizations do not have the resources or expertise to perform custom development, which can drain organizational resources, introduce competing priorities, lead to increased expenses, complicate maintenance activities, etc. As such, organizations can benefit from improved application, systems, and tools that empower users with the ability to access, query, obtain, and/or perform various operations with organizational data and/or other types of information available in computer systems.

The present disclosure provides examples of performing multilayered generation and processing of computer instructions based on a custom computer language. In examples of the present disclosure, a computer system may perform multilayered generation and processing of computer instructions, for example, based on receiving a request with instructions in a custom computer language, parsing the instructions in the custom computer language in view of one or more rules associated with the custom computer language, analyzing the instructions in the custom computer language based on information describing structure of an application associated with organizational data, generating one or more instructions in a different computer language other than the custom computer language based on the instructions in the custom computer language and the information describing structure of the application associated with the organizational data, obtaining a result from another application based on the instructions generated in the other computing language, and providing the result from the other application in response to the original request with the instructions in the custom computer language.

Example implementations of the present disclosure can be implemented in the context of or as a portion of an organizational management platform that controls and leverages organizational data to manage organizational applications such as payroll, operations, human resources (e.g., onboarding and offboarding), benefits, information technology and device management, third-party application integration and access, and many others.

The organizational management platform can hold, for each of one or more organizations, a centralized set of organizational data that acts as a single, centralized system of record for all organizational management processes for that organization. Each organization can include a number of users which are able to access and interact with the organizational management platform. Some users may have administrative permissions which define whether the user is able to access and/or modify certain types of organizational data for their organization.

The organizational data for each organization can include data directly entered into the organizational management platform and/or can include data retrieved, pulled, or otherwise obtained from one or more first party and/or third-party applications with which the organizational management platform may have varying levels of integration. This ingestion and storage of data from third-party applications is in contrast to systems which simply sit on top of third-party applications and apply rules at run time. In some implementations, the organizational management platform can provide a user with the ability (e.g., by configuring Simple Mail Transfer Protocol (SMTP) settings) to configure the cadence or periodicity at which the organizational management platform receives or ingests data (e.g., via .csv files) from third-party applications. Data can be transferred between the organizational management platform and third-party applications (e.g., to and/or from) using various techniques such as application programming interfaces, data hooks, flat files, bulk uploads/downloads and/or other data transfer mechanisms.

The organizational data can, in some implementations, be held as one or more object databases. For example, multiple object classes can be defined in the object databases. Example object classes include employees, devices, job candidates, benefits policies, documents, pay instances, timecards, and/or other objects. For each object, values can be provided and maintained for one or more attributes, such as location, role, salary, etc. Links can be made between different objects. For example, one or more device objects can be associated with employee objects.

The object database(s) can be represented as or can store data which can be represented as one or more graphs with nodes that correspond to objects and edges that correspond to links or logical associations between objects and/or object attribute(s). Graph(s) can be traversed to understand or leverage relationships among objects and their attribute(s). In one example, the organizational data can be synthesized into a single graph which includes multiple classes of objects and defines complex relationships among objects and their attribute(s). For example, all workflows, including payroll, IT, etc. can be run through one platform and graph. In some implementations, the employee objects can be referred to and/or treated as sentinel nodes.

In some implementations, the organizational data can include organizational structure data. For example, the organizational structure data can be encoded within links or edges defined between objects of the organizational data or can be stored as a separate data layer. For example, the organizational structure data can define organizational relationships between objects, including employee objects. As one example, the organizational structure data may indicate that a first employee object has the relationship of "manager" relative to a second employee object. The organizational relationships can be defined between specific objects and/or groups of objects. As another example, the organizational structure data may indicate that a first group of employees (e.g., the "IT Administrator" group of employees) has a certain set of permissions (e.g., device activation/deactivation) relative to a particular group of devices (e.g. the "work laptops" group of the devices).

Example implementations of the present disclosure leverage a domain-specific query language that can be used to perform (e.g., in real time) queries against the organizational data. The custom query language can be used to define functions or queries which return data that satisfies or responds to the functions or queries. In some implementations, the custom query language is a declarative language. In some implementations, the custom query language includes organization functions or operators which leverage organizational relationships within the organizational data. For example, the organization function ORG(employee, relationship) returns one or more other employees that have the specified relationship to the specified employee.

Specifically, according to an aspect of the present disclosure, the custom query language can be incorporated into reports, policies, triggering, data management, and/or workflows. For example, a user-constructed query in the custom query language can be used for intelligently facilitating various downstream operations, for example, by reference/query to an employee or organizational chart.

In one example, the custom query language can allow for the creation of "calculated fields" which can be data fields which are or act as a function of a custom query language script and can be propagated to or referenced by other reports, policies, triggering, data management, and/or workflows.

In other examples, custom query language expressions can underlie or be included in predefined reports, policies, triggering, data management, and/or workflows. These predefined items can be visible and modifiable by the user (e.g., in raw query expression form or via a wizard user interface). For example, in the wizard user interface, objects or functions can be automatically populated and/or suggested.

In some implementations, the custom query language can handle or include functions or expressions which include "organization" functions or operators which leverage employee or organizational data held by the core system of record. For example, as described elsewhere herein, the function ORG(employee,relationship) can return one or more other employees that have the relationship to the employee given in the function. Other example organization functions or operators may return employees or other data based on any of the employee or organizational data held by the core system of record (e.g., return all employees working in California making over $100,000/year).

The systems, methods, and computer program products described herein provide a number of technical effects and benefits. As one example, the embodiments described in the present disclosure provide automated generation and processing of computer instructions for use across a variety of applications and systems that utilize different underlying technologies and technical designs, for example, more efficiently and with fewer computing resources (e.g., less processing power, less memory usage, less power consumption, etc.), that would otherwise be wasted by maintaining custom, proprietary, and/or manual processes. In particular, examples of the present disclosure automate the generation and processing of computer instructions across different applications and systems using a rigorous computerized process.

With reference to the Figures, example embodiments of the present disclosure will be discussed in further detail.

FIG. 1 depicts a block diagram of an example environment 100 including a computing system 110 that performs operations according to example embodiments of the present disclosure. The environment 100 includes a network 102, a computing system 110, one or more computing devices 112, one or more processors 114, one or more memory devices 116, data 118, instructions 120, a remote computing system 130, one or more computing devices 132, one or more processors 134, one or more memory devices 136, data 138, instructions 140, one or more computing devices 152, one or more processors 154, one or more memory devices 156, data 158, and instructions 160.

The network 102 can include any type of communications network. For example, the network 102 can include a local area network (LAN), a wide area network (WAN), an intranet, an extranet, and/or the internet. Further, the network 102 can include any number of wired or wireless connections and/or links that can be used to communicate with one or more computing systems (e.g., the computing system 110 and/or the remote computing system 130) and/or one or more devices (e.g., the one or more computing devices 152). Communication over the network 102 can be performed via any type of wired and/or wireless connection and can use a wide variety of communication protocols (e.g., TCP/IP, HTTP, SMTP, FTP), encodings or formats (e.g., HTML, XML), and/or protection schemes (e.g., VPN, secure HTTP, SSL).

The computing system 110 can include any combination of systems and/or devices including one or more computing systems (not shown) and/or one or more computing devices 112. Further, the computing system 110 may be connected (e.g., networked) to one or more computing systems (e.g., remote computing system 130) and/or one or more computing devices (e.g., one or more computing devices 132, 152) via the network 102. The computing system 110 may operate in various different configurations including as a server or a client machine in a client-server network environment, or as a peer machine in a peer-to-peer (or distributed) network environment. Though the computing system 110 is depicted in FIG. 1 as a single device, the computing system 110 can include any collection or combination of devices that individually or in combination with other devices, execute a set of one or more instructions to perform any one or more of the operations discussed herein.

In this example, the computing system 110 includes the one or more computing devices 112. The one or more computing devices 112 can include any type of computing device. For example, the one or more computing devices 112 can include a personal computing device (e.g., a desktop computing device), a mobile computing device (e.g., a smartphone or tablet device), a wearable computing device (e.g., a smartwatch device), an embedded computing device, a web appliance, a server computing device, a network router, a switch, a bridge, or any device capable of executing a set of instructions (e.g., any combination of instructions which can include sequential instructions and/or parallel instructions) associated with one or more operations and/or one or more actions to be performed by the computing system 110 or any of the constituent components and/or devices of the computing system 110.

Any of the one or more computing devices 112 can include the one or more processors 114. The one or more processors 114 can include any processing device (e.g., a processor core, a microprocessor, an ASIC, a FPGA, a controller, or a microcontroller) and can include one processor or multiple processors that may be operatively connected. In some embodiments, the one or more processors 114 may include one or more complex instruction set computing (CISC) microprocessors, one or more reduced instruction set computing (RISC) microprocessors, one or more very long instruction word (VLIW) microprocessors, and/or one or more processors that are configured to implement other instruction sets.

The one or more computing devices 112 can include the one or more memory devices 116. The one or more memory devices 116 can be used to store data and/or information and can include one or more computer-readable media, one or more non-transitory computer-readable storage media, and/or one or more machine-readable media. Though the one or more memory devices 116 are depicted in FIG. 1 as a single unit (e.g., a single medium), the computer-readable storage media can include a single medium or multiple media (e.g., a centralized or distributed database, and/or associated caches and servers) that store one or more sets of instructions. Further, the computer-readable storage media can include any medium that is capable of storing, encoding, and/or carrying a set of instructions for execution by a computing device and which may cause the computing device to perform any of the one or more operations described herein. In some embodiments, the computer-readable storage media can include one or more solid-state memories, one or more optical media, and/or one or more magnetic media. By way of example, the one or more memory devices 116 can include any combination of random-access memory (RAM), read-only memory (ROM), EEPROM, EPROM, one or more flash memory devices, and/or one or more magnetic storage devices (e.g., one or more hard disk drives).

The one or more processors 114 can be configured to execute one or more instructions to perform the operations described herein including, for example, one or more operations associated with performing multilayered generation and processing of computer instructions in association with a custom query language (e.g., a custom query language for use with organizational data) across various types of applications and/or computer systems. Further, the one or more memory devices 116 can store the data 118 and/or the instructions 120, which can be executed by the one or more processors 114 to cause the one or more computing devices 112 to perform one or more operations. For example, the one or more operations performed by the one or more processors 114 can include receiving a request comprising one or more instructions in a first computer language, parsing the one or more instructions in the first computer language in view of one or more rules associated with the first computer language, analyzing the one or more instructions in the first computer language in view of information describing structure of a first application, generating one or more instructions in a second computer language different from the first computer language with the one or more instructions in the second computer language being generated based on the one or more instructions in the first computer language and the information describing structure of the first application, obtaining a result from a second application where the result comprises information based on the one or more generated instructions in the second computing language, and providing the result in response to the request comprising the one or more instructions in the first computer language, etc.

The data 118 can include organizational data (e.g., organizational data that can include one or more organizational records), one or more data structures defining, describing, and/or otherwise associated with the organizational data, rule data (e.g., rule data that includes one or more rules used to configure an application policy, one or more rules maintained by or otherwise associated with an organizational data management system, etc.), application data (e.g., application data associated with a plurality of applications including one or more third-party applications and/or one or more intra-organizational applications), third-party integration data (e.g., data providing configuration and/or other information for performing integration and synchronization with each of one or more different third-party systems and/or applications), organizational policy data (e.g., organizational policy data associated with one or more organizational policies), application policy data (e.g., policy data that includes one or policies associated with the organizational data, the rule data, the application data, one or more applications, one or more devices, etc.), data that includes instructions in a custom computer language (e.g., a custom query language based on organizational data), data that includes rules associated with the custom computer language, and/or other types of data. Further, the instructions 120 can include one or more instructions to use data including the data 118 to perform any one or more of the various operations described herein. In some embodiments, the one or more memory devices 116 can be used to store one or more applications that can be operated by the one or more processors 114. The data 118, the instructions 120, and/or the one or more applications can be associated with an organization. Further, the computing system 110 may be associated with an organization and may be configured to manage the one or more applications. For example, the computing system 110 can perform one or more operations associated with authenticating one or more users that attempt to access the one or more applications which can include one or more third-party applications, which may be remote from the computing system 110.

Any of the one or more computing devices 112 can include one or more input devices 122 and/or one or more output devices 124. The one or more input devices 122 can be configured to receive input (e.g., user input) and can include one or more touch screens, one or more keyboards, one or more pointing devices, (e.g., mouse device), one or more buttons, one or more microphones, and/or one or more cameras. The one or more output devices 124 can include one or more display devices, one or more loudspeaker devices, one or more haptic output devices. By way of example, the one or more output devices 124 can be used to display a graphical user interface via a display device that can include a touch screen layer that is configured to detect one or more inputs (e.g., one or more user inputs). The one or more processors 114 may perform one or more operations (e.g., operations associated with performing multilayered generation and processing of computer instructions) based at least in part on the one or more inputs.

The remote computing system 130 includes the one or more computing devices 132. Each of the one or more computing devices 132 can include one or more processors 134, one or more memory devices 136, the data 138, and/or the instructions 140. The remote computing system 130 can include any of the attributes and/or capabilities of the computing system 110. Further, the remote computing system 130 can communicate with one or more devices and/or one or more systems via the network 102.

In some embodiments, the remote computing system 130 can include one or more applications (e.g., computer software applications comprising computer instructions) that can be stored and/or executed by the remote computing system 130. Further, the one or more applications can include one or more third-party applications that may be accessed from the computing system 110 and which are at least partly operated from the remote computing system 130. The one or more third-party applications generally may be associated with and provided by an organization that is different from the organization that is associated with the computing system 110. Further, the data 138 can include one or more portions of the organizational data (e.g., one or more organizational records), one or more data structures associated with the organizational data, rule data, organizational policy data, application policy data, third-party integration data, and/or other types of data.

One or more computing devices 152 (e.g., user devices or any other types of devices) can include one or more processors 154, one or more memory devices 156, the data 158, and/or the instructions 160. Such one or more computing devices 152 may include any of the attributes and/or capabilities of the one or more computing devices 112, 132. Further, such one or more computing devices 152 can communicate with one or more devices and/or one or more systems via the network 102.

In some embodiments, the one or more computing devices 152 can include one or more applications (e.g., computer software applications comprising computer instructions) that can be stored and/or executed by such one or more computing devices 152. Further, the one or more applications can include one or more third-party applications that may be accessed from the one or more computing devices 152 and which are at least partly operated from such one or more computing devices 152. Data 138 may include, for example, one or more portions of the organizational data (e.g., one or more organizational records), one or more data structures associated with the organizational data, rule data, organizational policy data, application policy data, third-party integration data (e.g., third-party application integration data), and/or other types of data.

Figure 2:
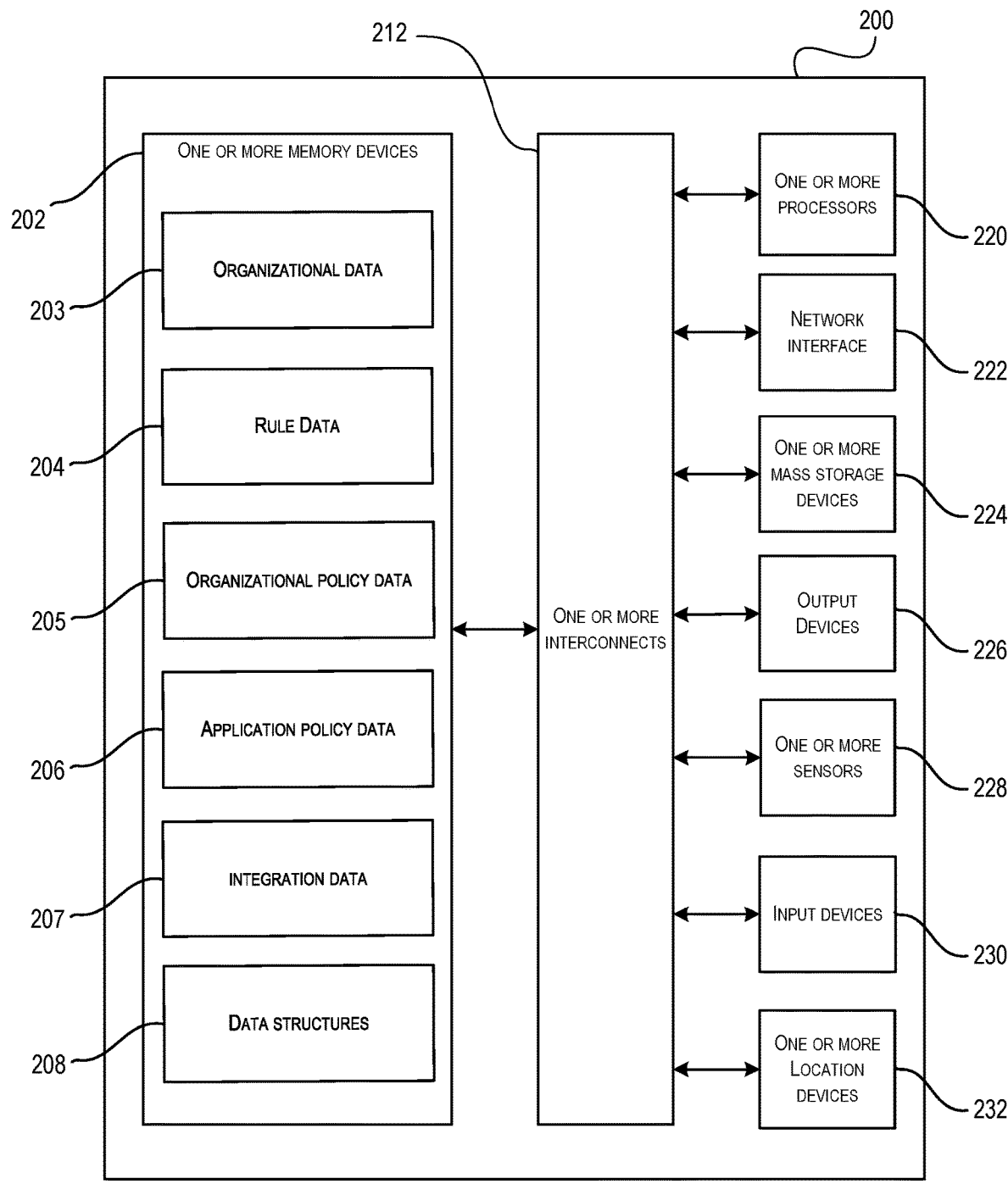
FIG. 2 depicts a block diagram of an example of a computing device, according to example embodiments of the present disclosure.

FIG. 2 depicts a block diagram of an example computing device 200 according to example embodiments of the present disclosure. The computing device 200 can include one or more attributes and/or capabilities of the computing system 110, the remote computing system 130, the one or more computing devices 152, and/or the computing device 200. Furthermore, the computing device 200 can be configured to perform one or more operations and/or one or more actions that can be performed by the computing system 110, the remote computing system 130, the one or more computing devices 152, and/or the computing device 200.

As shown in FIG. 2, the computing device 200 can include one or more memory devices 202, organizational data 203, rule data 204, organizational policy data 205, application policy data 206, integration data 207, data structures 208, one or more interconnects 212, one or more processors 220, a network interface 222, one or more mass storage devices 224, one or more output devices 226, one or more sensors 228, one or more input devices 230, and/or one or more location devices 232.

The one or more memory devices 202 can store information and/or data (e.g., organizational data 203, rule data 204, organizational policy data 205, application policy data 206, integration data 207, data structures 208, and/or any other types of data). Further, the one or more memory devices 202 can include one or more non-transitory computer-readable storage media, including RAM, ROM, EEPROM, EPROM, flash memory devices, magnetic disks, and any combination thereof. The information and/or data stored by the one or more memory devices 202 can be executed by the one or more processors 220 to cause the computing device 200 to perform one or more operations associated with performing multilayered generation and processing of computer instructions (e.g., in association with computer instructions in a custom query language) across various types of applications and/or computer systems, including, for example, receiving a request comprising one or more instructions in a first computer language, parsing the one or more instructions in the first computer language in view of one or more rules associated with the first computer language, analyzing the one or more instructions in the first computer language in view of information describing structure of a first application, generating one or more instructions in a second computer language different from the first computer language with the one or more instructions in the second computer language being generated based on the one or more instructions in the first computer language and the information describing structure of the first application, obtaining a result from a second application where the result comprises information based on the one or more instructions in the second computing language, and providing the result in response to the request comprising the one or more instructions in the first computer language.

The organizational data 203 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored respectively in any of the one or more memory devices 116, 136, 156. The organizational data 203 also can include information associated with one or more applications (e.g., one or more third-party applications), one or more organizational records and/or one or more organizational policies. In some embodiments, the organizational data 203 can be received from one or more computing systems (e.g., the remote computing system 130 depicted in FIG. 1) which can include one or more computing systems that are remote (e.g., in another room, building, part of town, city, or nation) from the computing device 200.

The rule data 204 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. The rule data 204 can include information associated with one or more rules that can be used to generate and/or implement an application policy. The rule data 204 also can include information associated with one or more rules of an organizational data management system (e.g., base or default rules provided or enforced by the system, one or more custom rules configured by an organization, etc.). The rule data 204 also can include one or more rules associated with implementing and/or utilizing a custom computer language, such as a custom computer language for performing operations associated with organizational data 203. In some embodiments, the rule data 204 can be received from one or more computing systems (e.g., the remote computing system 130 depicted in FIG. 1), which can include one or more computing systems that are remote from the computing device 200.

The organizational policy data 205 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. Furthermore, the organizational policy data 205 can include information associated with one or more organizational policies that are used to regulate one or more applications (e.g., one or more third-party applications), one or more computing devices, and/or one or more records which can include one or more organizational records and/or one or more employee records. In some embodiments, the organizational policy data 205 can be received from one or more computing systems (e.g., the remote computing system 130 depicted in FIG. 1) which can include one or more computing systems that are remote from the computing device 200.

The application policy data 206 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. Furthermore, the application policy data 206 can include information associated with one or more policies that are used to implement an application policy associated with one or more applications (e.g., one or more third-party applications), one or more computing devices, and/or one or more records which can include one or more organizational records and/or one or more employee records. In some embodiments, the application policy data 206 can be received from one or more computing systems (e.g., the remote computing system 130 depicted in FIG. 1) which can include one or more computing systems that are remote from the computing device 200.

The integration data 207 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. The integration data 207 can include configuration and/or operational information associated with integrating and synchronizing data (e.g., organizational data 203) among one or more applications. For example, the integration data 207 can include information that enables integration and synchronization between each of one or more applications (e.g., third-party applications and/or other applications). In an embodiment, the integration data 207 provides integration information that allows an organizational data management system (e.g., a system of record for organizational data and organizational data processing), for example, to obtain information from one or more applications (e.g., third party and/or other applications), to perform operations involving organizational data (e.g., organizational data 203) in the organizational data management system, to synchronize organizational data across one or more applications, to perform one or more actions involving the applications based on organizational data in the organizational data management system, and/or to perform one or more other operations associated with managing organizational data as a system of record. In some embodiments, the integration data 207 can be received from one or more computing systems (e.g., the remote computing system 130 depicted in FIG. 1), which can include one or more computing systems that are remote from the computing device 200.

The data structures 208 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. The data structures 208 can include one or more logical and/or physical instances of information representing or describing one or more entities (e.g., objects, records, etc.), one or more relationships involving one or more of the entities, one or more data values associated with each of one or more of the entities and/or one or more of the relationships, one or more functions and/or operations that may be applied to each of one or more of the entities and/or one or more of the relationships, any other data or metadata describing or otherwise defining structure and/or rules associated with one or more of the entities and/or one or more of the relationships, etc.

The data structures 208 can be implemented and utilized with one or more types of computer software, computer hardware, or any combination thereof. In an embodiment, the data structures 208 are used to represent and perform processing associated with various types of organizational data (e.g., organizational data 203). For example, the data structures 208 may include information about various types of information and entities associated with organizational data including, but not limited to, individuals (e.g., employees, vendors, independent contractors), departments, teams, roles, groups, locations, offices, documents, tasks, reports, accounts, devices, applications, end-user applications, licenses, workflows, alerts, and/or any other types of entities representing or related to managing organizational data (e.g., organizational data 203).

The data structures 208 also can define various relationships among the various entities associated with organizational data. For example, the data structures 208 may define and be used to enforce relationships such as each employee must be assigned to a department, each employee can be included on one or more teams, each employee must be assigned to a primary location, each employee may be assigned to one or more secondary locations, employees may have one or more computing devices, each vendor must have a current audit, each independent contractor must be associated with a contract, and/or any other relationships provided by an organizational data management system or configured for an organization that utilizes an organizational data management system (e.g., a system for managing organizational data 203 based on one or more organizational data management applications).

In some embodiments, the data structures 208 can include one or more object graphs providing information about entities, relationships, and/or any other aspects relating to the definition, structure, and rules associated with organizational data (e.g., organizational data 203). The data structures 208 also can include any one or more other types of data structures (e.g., with or without the use of object graphs) that provide information about entities, relationships, and/or any other aspects of the definition, structure, and/or rules associated with organizational data. In some embodiments, the data structures 208 can be received from one or more computing systems (e.g., the remote computing system 130 depicted in FIG. 1), which can include one or more computing systems that are remote from the computing device 200.

The one or more interconnects 212 can include one or more interconnects or buses that can be used to send and/or receive one or more signals (e.g., electronic signals) and/or data (e.g., organizational data 203, rule data 204, organizational policy data 205, application policy data 206, integration data 207, data structures 208, and/or any other data) between components of the computing device 200, including the one or more memory devices 202, the one or more processors 220, the network interface 222, the one or more mass storage devices 224, the one or more output devices 226, the one or more sensors 228 (e.g., a sensor array), the one or more input devices 230, and/or the one or more location devices 232. The one or more interconnects 212 can be arranged or configured in different ways. For example, the one or more interconnects 212 can be configured as parallel or serial connections. Further the one or more interconnects 212 can include one or more internal buses that are used to connect the internal components of the computing device 200 and one or more external buses used to connect the internal components of the computing device 200 to one or more external devices. By way of example, the one or more interconnects 212 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, IEEE 1394 interface (FireWire), and/or other interfaces that can be used to connect components.

The one or more processors 220 can include one or more computer processors that are configured to execute the one or more instructions stored in the one or more memory devices 202. For example, the one or more processors 220 can, for example, include one or more general purpose central processing units (CPUs), application specific integrated circuits (ASICs), and/or one or more graphics processing units (GPUs). Further, the one or more processors 220 can perform one or more actions and/or operations including one or more actions and/or operations associated with the organizational data 203, the rule data 204, the organizational policy data 205, the application policy data 206, the integration data 207, the data structures 208, and/or any other data. The one or more processors 220 can include single or multiple core devices including a microprocessor, microcontroller, integrated circuit, and/or a logic device.

The network interface 222 can support network communications. The network interface 222 can support communication via networks including a local area network and/or a wide area network (e.g., the internet). For example, the network interface 222 can allow the computing device 200 to communicate with the computing system 110 via the network 102.

The one or more mass storage devices 224 (e.g., a hard disk drive and/or a solid-state drive) can be used to store data including the organizational data 203, the rule data 204, the organizational policy data 205, the application policy data 206, the integration data 207, the data structures 208, and/or any other data. The one or more output devices 226 can include one or more display devices (e.g., liquid crystal display (LCD), OLED display, mini-LED display, micro-LED display, plasma display, and/or cathode ray tube (CRT) display), one or more light sources (e.g., LEDs), one or more loudspeakers, and/or one or more haptic output devices (e.g., one or more devices that are configured to generate vibratory output).

The one or more sensors 228 can be configured to detect various states and can include one or more cameras, one or more light detection and ranging (LiDAR) devices, one or more sonar devices, and/or one or more radar devices. Further, the one or more sensors 228 can be used to provide input (e.g., an image of a user captured using the one or more cameras) that can be used as part of invoking or performing one or more operations. For example, the one or more sensors 228 can be used to authenticate the identity of a user and determine an authorization level based on an image of the user's face that is captured using the one or more sensors 228.

The one or more input devices 230 can include one or more touch sensitive devices (e.g., a touch screen display), a mouse, a stylus, one or more keyboards, one or more buttons (e.g., ON/OFF buttons and/or YES/NO buttons), one or more microphones, and/or one or more cameras (e.g., cameras that are used to detect gestures that can trigger one or more operations by the computing device 200).

Although the one or more memory devices 202 and the one or more mass storage devices 224 are depicted separately in FIG. 2, the one or more memory devices 202 and the one or more mass storage devices 224 can be regions within the same memory module. The computing device 200 can include one or more additional processors, memory devices, and/or network interfaces, which may be provided separately or on the same chip or board. The one or more memory devices 202 and the one or more mass storage devices 224 can include one or more computer-readable media, including, but not limited to, non-transitory computer-readable media, RAM, ROM, hard drives, flash drives, and/or other memory devices.

The one or more memory devices 202 can store sets of instructions for applications including an operating system that can be associated with various software applications or data. For example, the one or more memory devices 202 can store sets of instructions for one or more applications (e.g., one or more organizational applications and/or one or more third-party applications) that are subject to one or more application policies or utilize third-party integration data that can be configured, generated, and/or implemented by the computing device 200 and/or one or more other computing devices or one or more computing systems. In some embodiments, the one or more memory devices 202 can be used to operate or execute a general-purpose operating system that operates on mobile computing devices and/or and stationary devices, including for example, smartphones, laptop computing devices, tablet computing devices, and/or desktop computers.

The software applications that can be operated or executed by the computing device 200 can include applications associated with the computing system 110, the remote computing system 130, and/or the one or more computing devices 152 that are depicted in FIG. 1. Further, the software applications that can be operated and/or executed by the computing device 200 can include native applications, web services, and/or web-based applications.

The one or more location devices 232 can include one or more devices or circuitry for determining the position of the computing device 200. For example, the one or more location devices 232 can determine an actual and/or relative position of the computing device 200 by using a satellite navigation positioning system (e.g. a GPS system, a Galileo positioning system, the GLObal Navigation satellite system (GLONASS), the BeiDou Satellite Navigation and Positioning system, an inertial navigation system, a dead reckoning system, based on IP address, by using triangulation and/or proximity to cellular towers or Wi-Fi hotspots, and/or beacons.

Figure 3:
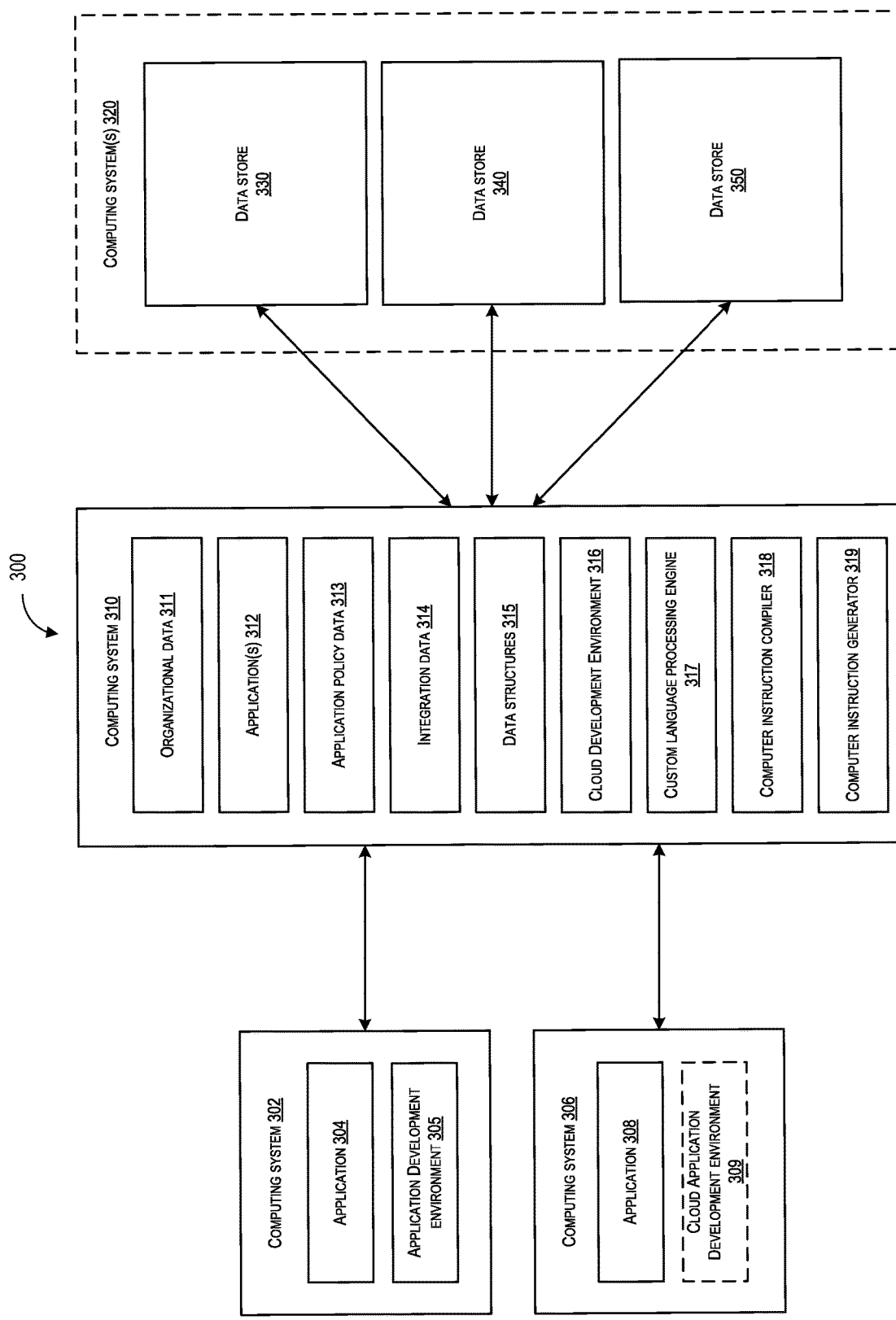
FIG. 3 depicts a block diagram of an example computing environment including multiple computing systems, according to example embodiments of the present disclosure.

FIG. 3 depicts a block diagram of an example computing environment 300 including multiple computing systems, according to example embodiments of the present disclosure. Any of computing system 302, computing system 306, or computing system 310 can include one or more attributes and/or capabilities of the computing system 110, the remote computing system 130, the one or more computing devices 152, and/or the computing device 200. Furthermore, any of the computing system 302, the computing system 306, or the computing system 310 can be configured to perform one or more operations and/or one or more actions that can be performed by the computing system 110, the remote computing system 130, the one or more computing devices 152, and/or the computing device 200.

As shown in FIG. 3, the environment 300 includes the computing system 302, an application 304, an application development environment 305, the computing system 306, an application 308, a cloud application development environment 309, the computing system 310, organizational data 311 (e.g., organizational data 203), one or more application(s) 312, application policy data 313, integration data 314, data structures 315, cloud development environment 316, custom language processing engine 317, computer instruction compiler 318, computer instruction generator 319, one or more computing systems 320, data store 330, data store 340, and data store 350.

In an embodiment, the computing system 302, the computing system 306, the computing system 310, and/or the computing system(s) 320 can be configured to communicate directly and/or via a communication network (e.g., the network 102 depicted in FIG. 1). In one embodiment, the computing system 302 includes an application 304 that is stored and/or operates on the computing system 302 and can communicate (e.g., send and/or receive data and/or information) with one or more other computing systems including the computing system 306 and/or the computing system 310. The application 304 can, for example, include an email application that performs one or more operations on the computing system 302 and includes an email account associated with an organizational record (e.g., an employee record including the name of an employee, an email access identifier, and an email passcode) that is stored as part of the organizational data 311. In an example, a user associated with any computing system 302, 306, 310 can use a portion of the organizational data 311 associated with their employee record to access a corresponding account associated with one or more of application 304, application 308, and/or application(s) 312.

In an embodiment, one or more application(s) 312 provide access to, utilize, support, and/or otherwise provide various interfaces or services that enable other applications (e.g., application 304, application development environment 305, application 308, cloud application development environment 309, application(s) 312) and/or users to perform various operations and activities involving one or more custom computer languages. For example, a custom computer language generally may provide users with a simplified set of computer instructions that align with or match a user's understanding of a functional or business environment, such as an organization, business, industry, sector, etc. In some embodiments, each of one or more custom computer languages is a user language that allows users with a basic understanding of a subject, topic, business area, organization, functional role, industry, sector, etc. to implement custom computer instructions in terms that are familiar to the users, without knowledge of a complex computer programming language, without dependence on computer programmers, without being aware of or needing to know the complexity of underlying data organization and storage, without needing to understand, implement, and/or maintain a complex web of join conditions across various sets of underlying data, etc.

In an embodiment, a custom computer language generally enables users of any skill or level with a basic knowledge of a subject area to perform one or more operations or activities associated with an application (e.g., any of applications 312). For example, a custom computer language generally may enable a user to create, update, execute, and/or otherwise implement custom queries, reports, policies, workflows, triggering conditions, and/or other functionality and operations associated with an application. In some embodiments, a custom computer language enables a user to utilize and perform various operations involving organizational data 311. For example, one or more applications associated with an organizational data management system or any other types of applications (e.g., applications 312) generally may provide a custom computer language allowing users to perform operations based on the structure and/or relationships associated with organizational data 311.

In an embodiment, a custom computer language may allow a user to use simplified terms to query organizational data 311. In one example, a custom computer language may allow a user to obtain the name of an employee's manager with the following example query: "ORG(John Smith, Manager)", which may return "Jane Jones" as the manager of the employee. As such, a custom computer language for an application may allow a user to use simplified and familiar terms without needing to understand complex interrelationships between various types of data stored across one or more different databases and/or other types of data stores. Further, a custom computer language generally may be processed by one or more applications (e.g., application(s) 312 associated with an organizational data store) so that users do not have to specify data joins when performing various operations involving organizational data 311.

In an embodiment, a custom computer language (e.g., a custom query language) includes a function that reports quantile information based on employee information or any other type of organizational data 311. For example, such a function generally may be labeled as a "quantile" function, as a "percentile" function, or given any other type of label or name. The following examples generally refer to the function name as "quantile" for illustration purposes only.

In an example, a "quantile" function of a custom query language generally may return a particular quantile (e.g., decile, percentile, etc.) of organizational data 311 (e.g., an employee, a department, etc.) in comparison to other corresponding organizational data 311 (e.g., other employees, other departments, etc.). In one example, a "quantile" function call in a custom query language may take four arguments. For example, a first example argument of the "quantile" function may specify a particular instance of organizational data 311 such as a particular employee, a particular department, a particular contractor, a particular vendor, or any other particular instance of organizational data 311. A second example argument of the "quantile" function may specify a numeric attribute value, a derived value, or a calculated value for comparison. A third example argument of the "quantile" function may specify a logical condition that evaluates to "true" or "false" for corresponding organizational data 311 (e.g., other employees, other departments, etc.) where the corresponding organizational data 311 that evaluates to "true" is included when calculating quantile information. As such, corresponding organizational data 311 that evaluates to "false" would not be included when calculating quantile information. A fourth example argument of the "quantile" function may specify a particular quantile to use for analysis. For example, the example fourth argument may specify a numeric value representing a number of buckets to use for calculating a particular quantile (e.g., the value "4" for quartiles, the value "5" for quintiles, the value "10" for deciles, the value "100" for percentiles and/or any other value for calculating a particular, specialized quantile associated with organizational data 311). The example fourth argument also could take text input indicating a particular type of quantile to utilize (e.g., "quartile", "quintile", "decile", "percentile", etc.) and is not limited to numeric values.

In one example, a signature of an example "quantile" function of a custom computer language (e.g., a custom query language) generally can be defined and/or appear as "QUANTILE({employee_information}, {attribute_value_to_compare}, {logical_condition}, {quantile_type})". For example, an example call to the "quantile" function of the custom query language generally may be invoked based on the following example custom query language statement: "QUANTILE("Denise Smith", compensation, level=$level, 10). In the example quantile function call, the first example argument specifies the name of a particular employee or individual. Other values, such as a unique employee identifier, unique contractor identifier, and/or any other type of unique identifier of a particular instance of organizational data 311 may be utilized (e.g., unique department name, unique department id, etc.).

The second example argument in the example quantile function call indicates compensation as the attribute of the specified employee (i.e., "Denise Smith") to be compared. Also, any derived or calculated values, such as "TODAY( )—employee_start_date" (e.g., which calculates an employee's length of employment) may be utilized. The third example argument in the example quantile function call indicates a logical condition where the level of other employees "level" is equal "=" to the level of "Denise Smith" "$level". As such, employees at the same level as "Denise Smith" in an organizational data management system as indicated by the organizational data 311 will be included in the QUANTILE determination of the current example. The fourth example argument in the example quantile function call "10" indicates that 10 quantiles (i.e., "deciles") are to be used in the calculation of determining how "Denise Smith's" "compensation" compares to other employees at the same level (i.e., "level=$level"). Thus, "Denise Smith" may fall into any one of 10 buckets depending on how her "compensation" compares to other employees in an organization based on organizational data 311.

The example QUANTILE function generally can return the number of the particular, specified quantile (e.g., the bucket number) based on a determination. Continuing with the current example, if "Denise Smith" had "compensation" that ranked in the top ten percent of employees at the same level (i.e., "level=$level") then "10" would be returned as the determined decile bucket of the example quantile function (or, for example if quartiles were specified instead of quintiles, then "4" would be returned). Similarly, if the "compensation" of "Denise Smith" ranked last in the determination, then a "1" would be returned as the determined decile bucket of the example quantile function ("1" also would be returned if quartiles were specified instead of quintiles). In an additional example, a custom query language statement: "QUANTILE("Denise Smith", equity_grant, start_date<$start_date+90 and start_date>$start_date−90 and equity_grant>0, 100) returns "Denise Smith's" "equity grant" decile in comparison to other employees with start dates within 90 days of "Denise Smith's" start date where those employees have equity grants.

In an embodiment, a custom computer language is based on and/or otherwise associated with one or more data structures 315 associated with an application. For example, a custom computer language may be based on, represent, describe, or otherwise be associated with an object graph data structure 315 (e.g., a master object graph, any one or more portions of a master object graph, etc.) and/or any other types of data structures 315 that describe the structure of an application and/or the underlying data associated with an application. In an example, a custom computer language is based on the structure of one or more applications and/or associated organizational data 311 of an organizational data management system. For example, the structure of the one or more applications and/or the associated organizational data 311 may be represented and described in one or more data structures 315 including, but not limited to, one or more independent and/or interrelated object graph data structures 315. In various embodiments, an application (e.g., one of application 312) and/or another supporting application used in association with the application can utilize object graph data structures 315 to process and perform various underlying operations associated with custom computer language instructions.

In an embodiment, the computing system 302 includes an application development environment 305 that provides users with access to and/or operations associated with one or more computer languages including, but not limited to, a custom computer language. For example, the application development environment 305 can be associated with one or more applications of an organizational data management system that stores and manages various types of organizational data 311. In an example, application development environment 305 generally may be an application (e.g., application 304) or portion of an application that enables a user to perform various operations involving organizational data 311 of an organizational data management system using a custom computer language. For example, application development environment 305 generally may enable a user to create, update, execute, and/or otherwise implement custom queries, reports, policies, workflows, triggering conditions, rules, group assignments, and/or other functionality and operations associated with one or more applications of an organizational data management system.

In various embodiments, any one or more parts of the application development environment 305 may run, for example, on a computing system (e.g., computing system 302) and/or in association with information, applications, and/or services on another computing system (e.g., computing system 310). For example, application development environment 305 may utilize organizational data 311, application(s) 312, application policy data 313, integration data 314, and/or data structures 315 available from another computing system (e.g., computing system 310, one or more computing systems associated with an organizational data management system, etc.). Application development environment 305 also may include a query processing engine (not shown), computer instruction compiler (not shown), computer instruction generator (not shown), and/or other specialized computer software for performing multilayered generation and processing of computer instructions. Application development environment 305 also may utilize or work in conjunction with, in whole or in part, cloud development environment 316, custom language processing engine 317, computer instruction compiler, 318, computer instruction generator 319, and/or other features and or operations available from another computing system (e.g., computing system 310, one or more computing systems associated with an organizational data management system, etc.)

In an embodiment, application development environment 305 can include an editor that allows users to enter, define, edit, check, store, schedule, execute, and/or perform any other operations associated with creating, viewing, maintaining, and/or utilizing computer instructions in a custom computer language. In some embodiments, application development environment 305 includes a textual editor that enables users to enter and manipulate computing instructions in a custom computer language. In some examples, a textual editor of the application development environment 305 may assist users with constructing various types of statements in a custom computer language. For example, the textual editor may provide syntax highlighting in a custom computer language, intelligent completion of keywords or statements in a custom computer language, automated hints and examples, various types of pop-up information to assist a user in writing or editing instructions in a custom language, visual notification of syntax or other errors, suggested correction of syntax or other errors, automatic suggestion and/or population of objects and/or functions, etc. In some examples, automation and other assistance provided by a textual editor of the application development environment 305 may be based on and may actively utilize one or more data structures 315 (e.g., an object graph based on organizational data 311) associated with implementation of a custom computer language.

In an embodiment, application development environment 305 can include a visual editor (e.g., either with or without a textual editor) to, for example, create, view, maintain, and/or utilize computer instructions in a custom computer language. For example, the visual editor may allow users to build, modify, and perform other operations associated with instructions in a custom computer language via drag and drop and/or any other types of graphical user interfaces. Further, a visual editor generally also may provide drop-down lists, enhanced browsing, and other visual access to features and operations of a custom computer language, and/or one or more data structures 315 associated with a custom computer language or related application to construct, edit, and/or otherwise utilize instructions in a custom computer language. In some examples, the application development environment 305 may provide a textual editor in combination with the visual editor to allow users to view, utilize, and alternate between both textual and visual editors of a custom query language, for example, as part of the same user interface. In some examples, application development environment 305 can parse and perform various operations involving instructions in a custom computer language alone or in association with another computing system (e.g., based on various data and/or services provided by computing system 310).

In an embodiment, the computing system 310 includes one or more application(s) 312 that can perform one or more operations on the computing system 310 and can communicate data and/or information with any one or more computing systems, including the computing system 302 and/or the computing system 306, or any one or more computing devices. The application(s) 312 can, for example, include an employee management application that operates on the computing system 310 and accesses the organizational data 311, which can include one or more organizational records associated with the names of organization employees and the respective employment statuses for each of the employees (e.g., an employee's position or role within the organization, an organizational department associated with the employee, etc.). A user (e.g., a privileged user, such as a manager or administrator with the authority to access and/or modify the organizational data 311) associated with the computing system 306 can, for example, access and/or modify the organizational data 311 to reflect when an employee receives a promotion or a raise, changes to a different department, is added to one or more new teams, is assigned new computer hardware or other equipment, etc.

The one or more application(s) 312 can perform one or more operations on the computing system 310 and can communicate data and/or information with one or more computing systems, including the computing system 302 and/or the computing system 306, or any one or more computing devices. The application(s) 312 can, for example, include an administrative or other type of system application to manage one or more aspects of the application(s) 312 including, but not limited to, installing, configuring, maintaining, updating, integrating, automating and/or performing one or more other operations associated with the application(s) 312 on the computing system 310 and that can manage one or more aspects of one or more other applications on different systems and devices, which may include the application 304 and/or the application 308.

In some embodiments, the application(s) 312 can include one or more third-party applications that are stored and/or perform operations on the computing system 310. Further, the application(s) 312 can retrieve data and/or information associated with and/or operate in cooperation with applications external to the computing system 310 (e.g., the computing system 302 and/or the computing system 306). The application(s) 312 can also use (e.g., access, modify, and/or control) the organizational data 311. For example, the application(s) 312 can use the organizational data 311 that is associated with the application 304 to perform one or more operations using the application 308 that is on the computing system 306.

In an embodiment, the computing system 306 includes a cloud application development environment 309. For example, the cloud application development environment 309 generally may be an instance of an online integrated development environment (e.g., a cloud development environment 316) provided by one computing system (e.g., 310) that is accessed from a web browser and/or any other type of application 308 on another computing system (e.g., computing system 306). For example, the cloud application development environment 309 can be associated with one or more applications of an organizational data management system that stores and manages various types of organizational data 311. In an example, cloud application development environment 309 generally may be an application (e.g., application 308) or portion of an application that enables a user to perform various operations involving organizational data 311 of an organizational data management system using a custom computer language. For example, cloud application development environment 309 generally may enable a user to create, update, execute, and/or otherwise implement custom queries, reports, policies, workflows, triggering conditions, rules, group assignments, and/or other functionality and operations associated with one or more applications of an organizational data management system.

In various embodiments, any one or more parts of the cloud application development environment 309 may run, for example, on a computing system (e.g., computing system 306) and/or in association with information, applications, and/or services on another computing system (e.g., computing system 310). For example, cloud application development environment 309 may utilize organizational data 311, application(s) 312, application policy data 313, integration data 314, and/or data structures 315 available from another computing system (e.g., computing system 310, one or more computing systems associated with an organizational data management system, etc.). Cloud application development environment 309 also may include a query processing engine (not shown), computer instruction compiler (not shown), computer instruction generator (not shown), and/or other specialized computer software for performing multi-layered generation and processing of computer instructions. Cloud application development environment 309 also may utilize or work in conjunction with, in whole or in part, cloud development environment 316, custom language processing engine 317, computer instruction compiler, 318, computer instruction generator 319, and/or other features and or operations available from another computing system (e.g., computing system 310, one or more computing systems associated with an organizational data management system, etc.)

In an embodiment, cloud application development environment 309 can include an editor that allows users to enter, define, edit, check, store, schedule, execute, and/or perform any other operations associated with creating, viewing, maintaining, and/or utilizing computer instructions in a custom computer language. In some embodiments, cloud application development environment 309 includes a textual editor that enables users to enter and manipulate computing instructions in a custom computer language. In some examples, a textual editor of the cloud application development environment 309 may assist users with constructing various types of statements in a custom computer language. For example, the textual editor may provide syntax highlighting in a custom computer language, intelligent completion of keywords or statements in a custom computer language, automated hints and examples, various types of pop-up information to assist a user in writing or editing instructions in a custom language, visual notification of syntax or other errors, suggested correction of syntax or other errors, automatic suggestion and/or population of objects and/or functions, etc. In some examples, automation and other assistance provided by a textual editor of the cloud application development environment 309 may be based on and may actively utilize one or more data structures 315 (e.g., an object graph based on organizational data 311) associated with implementation of a custom computer language.

In an embodiment, cloud application development environment 309 can include a visual editor (e.g., either with or without a textual editor) to, for example, create, view, maintain, and/or utilize computer instructions in a custom computer language. For example, the visual editor may allow users to build, modify, and perform other operations associated with instructions in a custom computer language via a drag and drop and/or any other types of graphical user interfaces. Further, a visual editor generally also may provide dropdown lists, enhanced browsing, and other visual access to features and operations of a custom computer language, and/or one or more data structures 315 associated with a custom computer language or related application to construct, edit, and/or otherwise utilize instructions in a custom computer language. In some examples, the cloud application development environment 309 may provide a textual editor in combination with the visual editor to allow users to view, utilize, and alternate between both textual and visual editors of a custom query language, for example, as part of the same user interface.

The computing system 310 includes the application policy data 313 which can be implemented on the computing system 310 and can be used to perform one or more operations associated with implementing an application policy associated with the organizational data 311 and/or one or more applications including the application 304, the application 308, and/or application(s) 312. The application 304, the application 308, and/or application(s) 312 can include one or more third-party applications that are separate from, that are operated separate and apart from, and that are not affiliated with the organization that manages, owns, controls and/or maintains the organizational data 311 or an associated organizational data management application on the computing system 310, and/or that determines or implements an application policy associated with the application policy data 313. In one example, third-party applications can be differentiated from organizational applications that, for example, are inherent to, are a part of, or otherwise operate directly or as part of an organizational data management application, system, services, and/or platform.

The application policy data 313 can include one or more rules that determine how one or more applications including, for example, one or more third-party applications or organizational applications are accessed, modified, and/or controlled. For example, the application policy data 313 can use the organizational data 311 that is associated with the application 304 to perform one or more operations on the application(s) 312 and/or the application 308. Also, the application policy data 313 can use the organizational data 311 that is associated with the application(s) 312 to perform one or more operations on the application 304 and/or the application 308. By way of further example, the application policy data 313 can use the organizational data 311 that is associated with the application 308 to perform one or more operations on the application 304 and/or the application(s) 312. In some embodiments, the application policy data 313 can determine how a combination of one or more organizational applications (e.g., applications owned and controlled by an organization that owns and controls the organizational data 311 and/or applications provided with or as part of an organizational data management system used by the organization as a system of record for maintaining the organizational data 311, etc.) and/or one or more third-party applications are accessed, modified, configured, and/or controlled.

The computing system 310 includes the integration data 314, which can reside on the computing system 310 and can be used, for example, to perform one or more operations that integrate the organizational data 311 and associated activities based on the organizational data 311 across one or more different computing systems (e.g., such as computing systems 302, 306, and 310) and/or applications (e.g., such as applications 304, 308, and 312). For example, the integration data 314 can be used to integrate and synchronize organizational data 311 and/or associated operations across an organizational data management application or system (e.g., a system of record for organization data 311) and each of one or more separate third-party applications that utilize organizational data 311 and/or perform operations based on organizational data 311.

In an embodiment, the integration data 314 can include configuration information associated with integrating and synchronizing data among one or more computing systems and/or applications. For example, the integration data 314 can include information that enables integration between an organizational application (e.g., an application 312 associated with an organizational data management system of record for the organizational data 311) and each of one or more separate third-party applications (e.g., application 304, 308) that use or perform operations based on the organizational data 311). Such integration data 314 may include, but is not limited to, information indicating and/or describing various data that enables performance of an integration between applications or systems, such as an integration type information (e.g., flat file, application programming interface (API), webhook, system call, etc.), security information (authentication information, encryption information, etc.) technical information (e.g., file locations, call information, system naming, application naming, IP address information, port information, etc.), integration flow information (e.g., push, pull, bidirectional, etc.), integration activation (e.g., scheduling or timing information, event information, one or more rules, one or more triggering conditions or criteria, etc.), processing information (e.g., data mappings between the source and target, data validation rules, data transformations, error handling, etc.), and/or any other information used in defining, configuring, and/or integrating an application with each of any number of third-party applications and/or systems.

The computing system 310 includes the data structures 315, which can be implemented on the computing system 310 and used to perform operations involving the organizational data 311 including, but not limited to, performing integration and synchronization of the organizational data 311 with one or more different third-party applications and/or systems, generating and processing computer instructions across one or more different systems based on the organizational data 311, etc. In an embodiment, the data structures 315 generally can include information about the properties or attributes of each of one or more entities associated with the organizational data 311. Data structures 315 also can include information describing relationships associated with one or more entities associated with the organizational data 311 (e.g., explicit relationships defined between entities, virtual relationships determined based on various attributes and data associated with entities, etc.). In some embodiments, the data structures 315 generally can be used in validating and processing the organizational data 311 and/or other information received from third-party applications and/or systems. The data structures 315 also can be used in association with performing or otherwise carrying out one or more operations involving the organizational data 311 including, but not limited to, processing requests, validating queries, generating and processing computer instructions, generating workflows, executing workflows, creating reports, running reports, etc.

In an embodiment, the data structures 315 can include one or more object graphs and/or any other types of data structures that provide information about entities, relationships, rules, constraints, and/or any other aspects of managing the organizational data 311. For example, such object graphs can include one or more nodes representing entities associated with the organizational data 311 and one or more edges that connect and represent relationships between the nodes (e.g., explicit edges defining relationships between entities and data, virtual edges inferring relationships between entities and data, etc.). The data structures 315 can also include organizational data and/or associated metadata. In addition, the data structures 315, together or alone, generally may represent one or more structural aspects of an application or system (e.g., such as an organizational data management system that is a system of record for organizational data 311 of an organization). In various examples, the data structures 315 generally may be used to support multilayered generation and processing of computer instructions. For example, the data structures 315 may be used to generate new instructions in a computer language that is different from a custom computer language provided to users. Further, such new instructions generally may include one or more operations (e.g., one or more underlying data joins) that are identified and included in the generated instructions based on analyzing instructions received in the custom computer language in view of the data structures 315.

The computing system 310 includes the cloud development environment 316, which can be implemented on the computing system 310, for example, to provide users with access to an environment for writing, building, testing, executing, and/or performing any other types of operations involving instructions in a custom computer language. In an embodiment, the cloud development environment 316 may include and/or perform operations associated with any one or more of the custom language processing engine 317, the computer instruction compiler 318, and/or the computer instruction generator 319. In addition, the cloud development environment 316 may run on one computing system (e.g., computing system 310) and provide one or more services to applications running on another computing system (e.g., application development environment 305 on computing system 302, cloud application development environment 309 on computing system 306, etc.). Further, the cloud development environment 316 may perform any one or more of the operations previously described with respect to application development environment 305 and/or cloud application development environment 309. Similarly, application development environment 305 and/or cloud application development environment 309 may perform any one or more of the operations described in association with cloud development environment 316.

The computing system 310 includes the custom language processing engine 317, which can be implemented on the computing system 310 and used to perform operations associated with processing requests based on instructions in a custom computer language. In various embodiments, the custom language processing engine 317 may receive requests for processing that include one or more instructions in a custom computer language. For example, such requests may be received from one or more different computing systems (e.g., computing system 302, computing system 306, computing system 310, etc.) and/or one or more different applications (e.g., application 304, application development environment 305, application 308, cloud application development environment 309, application(s) 312, cloud development environment 316, etc.).

Custom language processing engine 317 may be associated with or utilize the computer instruction compiler 318 and/or the computer instruction generator 319, which individually or in combination, may be separate or a part of the custom language processing engine 317.

In an embodiment, the computer instruction compiler 318, can be implemented on the computing system 310 and used to perform operations associated with analyzing instructions in a custom computer language including, but not limited to, parsing and analyzing custom computer language instructions based on one or more rules associated with a custom computer language and/or associated data structures 315, for example, to determine whether any error exists in the custom computer language instructions, to identify one or more errors in the custom computer language instructions, to return information about one or more of the identified errors, to determine when the custom computer language instructions are free from error, etc. The computer instruction compiler 318 may include or be associated with a computer instruction generator 319 that generates one or more new instructions from custom computer language instructions.

In an embodiment, the computer instruction generator 319, can be implemented on the computing system 310 and used to perform operations associated with generating one or more new instructions in the custom computer language or in a different computer language. For example, the computer instruction generator 319 may generate instructions in a different computer language, for example, for execution with one or more other applications or data stores (e.g., data store 330, data store 340, data store 350, etc.) on or associated with computing system 310 and/or one or more other computing systems (e.g., computing system(s) 320), based on analyzing instructions in the first computer language in combination with other information (e.g., information associated with one or more data structures 315 describing the structure of an application associated with an organizational data management system that manages organizational data 311).

In an embodiment, one or more data stores (e.g., data store 330, data store 340, data store 350) may run individually and/or in any combination on one or more different computing systems (e.g., computing system 310, and/or computing system(s) 320). Each data store generally may include one or more collections of data, such as organizational data 311 and/or other data that is associated with and/or accessible from application(s) 312 and/or other applications running on corresponding computing system(s) 320. In one example, each data store may be associated with a particular database application or any other type of data storage software applications that store and provide access to organizational data 311. In some examples, each data store may provide access to organizational data 311 via the same computer language (e.g., a standard computer language for data access). In some examples, any one or more of the data stores each may use different computer languages to provide access to organizational data 311 (e.g., one or more standard computer languages, one or more proprietary computer languages, and/or specialized data access languages).

In an embodiment, custom language processing engine 317 uses new instructions generated from one or more instructions in a custom computer language to query one or more data stores (e.g., data store 330, data store 340, data store 350). In various examples, custom language processing engine 317 then may process, combine, and/or generally perform any other types of operations on information (e.g., organizational data 311) obtained from the one or more data stores. In addition, the custom language processing engine 317 then may return the results obtained from the one or more data stores in response to a request based on one or more instructions in a custom computer language.

In an embodiment, an application store computing system (not shown) provides an organization with access to multiple different integration applications (not shown) for integrating organizational data 311 and/or associated processes with and across various different applications and/or systems (e.g., such as third-party applications and/or systems). An application store computing system also may provide an organization with one or more other types of applications, including but not limited to, platform utility apps that provide additional functionality to an organizational data management application or system, other apps that may include integration-related applications, and/or any other types of applications. Generally, the application store computing system may provide one or more various applications for a flat fee, based on a subscription purchase, for a fee based on usage, for a fee based on a number of users, computing systems, processors, or any other criteria, as part of a limited trial, for free, and/or generally under any type of arrangement. In an embodiment the application store computing system is managed and provided by the same party that provides an organizational data management system to organizations. For example, the integration applications provided by the application store computing system generally may be specialized for use with the organizational data management system (e.g., and not end-user versions of applications that would be installed for general purpose use by end-users on end-user devices).

In an embodiment, the integration applications generally can be any application that allows an organization to manage any one or more aspects associated with providing one or more corresponding end-user applications to individual members (e.g., employees), teams, roles, departments, and/or any other grouping or categorization of individuals in an organization. For example, each of the integration applications can be used by an organization to control and automate various tasks associated with provisioning, configuring, maintaining, and integrating third-party applications. In some embodiments, one or more of the integration applications can allow an organization to configure automated assignment of a corresponding end-user application to one or more individuals, user account creation, single sign-on setup, provisioning, installation, setup, and/or maintenance of corresponding end-user applications (e.g., third-party applications or other applications provided for use by end users) provided to particular individuals, groups, and/or one or more devices associated with such individuals or groups in the organization.

In an embodiment, one or more of the integration applications can provide integration of organizational data 311 and associated services across third-party applications or computing systems and one or more applications or computing systems of an organization associated with organizational data 311. For example, each of the integration applications can provide one or more of user account creation, single sign-on integration, user account suspension or removal, user management, group management, user privileges, user data access, user data control, template management, data integration, process automation, and/or any other types of integration between applications (e.g., third-party applications or other applications) that are associated with organizational data 311 of an organization.

In an embodiment, the integration applications and/or other applications provided by the application store computing system may include, but are not limited to, collaboration apps, support apps, design apps, development apps, finance and legal apps, human resources (HR) and benefits apps, information technology (IT), device management, and security apps, office management apps, sales and marketing apps, charitable apps, platform utility apps, and/or other apps. Generally, various different types of applications provided by the application computing system may be organized, categorized, grouped, presented, and/or otherwise offered in any type of arrangement, and thus are not limited to any particular examples discussed herein, which are provided for illustration purposes only.

In an embodiment, collaboration apps may include, for example, any applications that provide scheduling, communications, document sharing and management, electronic signature services, project management, productivity, and/or any other types of applications that facilitate work between individuals, groups, and/or parties.

In an embodiment, support apps may include, for example, any applications that provide services associated with customer support, technical support, issue reporting, issue management and escalation, tracking and managing help desk tickets, and/or any other types of applications that facilitate customer, business, and/or technology support.

In an embodiment, design apps may include, for example, any applications that provide services associated with creating graphic designs, product designs, prototypes, drawings, graphical user interfaces, user experiences, and/or any other types of applications that facilitate the creation of designs, interfaces, and/or artistic works.

In an embodiment, development apps may include, for example, any applications that provide services associated with software development, software testing, source code control and management, source code scanning, application testing, process automation, cloud hosting and services, system monitoring, error reporting and alerts, machine learning, and/or any other types of applications that facilitate activities associated with building, maintaining, or deploying software applications.

In an embodiment, finance, operational, and legal apps may include, for example, any applications that provide services associated with accounting systems, budgeting systems, vendor management systems, payment systems, travel systems, expense management systems, supply chain systems, manufacturing systems, compliance and governance systems, vendor management systems, contract management systems, and/or any other types of applications and/or systems used to manage various aspects of an organization.

In an embodiment, human resources (HR) and benefits apps may include, for example, any applications that provide services associated with recruiting and hiring, temporary staffing, background checks, payroll and benefits, training and onboarding, retirement planning and contributions, reward and bonus programs, employee training, learning management systems, performance management, time and attendance, and/or systems any other types of applications or systems associated with employee-related activities.

In an embodiment, information technology (IT), device management, and security apps may include, for example, any applications that provide services associated with device management, technology, information security, password management, and/or any activities associated with managing applications, systems, devices, or associated technology.

In an embodiment, office management apps may include, for example, any applications that provide services associated with facilities management, receptionist services, physical access, visitor access, catering services, office layout, office assignments, and or any other types of applications or systems associated with performing office management.

In an embodiment, sales and marketing apps may include, for example, any applications that provide services associated with social media, analytics, advertising, event management, customer relationship management, content creation and distribution, public relations, business generation, campaign management, and/or any other types of similar or related activities.

In an embodiment, charitable apps may include, for example, any applications that provide services associated with donations, charitable giving, crowdfunding, etc.

In an embodiment, platform utility apps may include, for example, any applications from a provider that allow an organization to utilize software applications, systems, or services that have been purchased or that are otherwise available from the provider. For example, a provider of an organizational data management system can allow an organization to access and utilize standard services and/or enhanced services via one or more of the platform utility apps. In some embodiments, the platform utility apps operate from and/or are directly integrated with applications, systems, and/or services obtained from a provider. For example, such platform utility apps can allow one or more users of an organization to customize a particular implementation or instance of provider software that is associated with the organization. In one example, one of the platform utility apps can allow the creation and/or modification of one or more custom fields in association with one or more entities, the creation and/or modification of one or more relationships among the entities, the creation and/or modification of one or more default system rules or custom rules, the addition and/or use of custom fields, custom relationships and/or custom rules in various workflow tasks, reports, integrations, etc. In some embodiments, users may create and modify custom fields, relationships, rules, tables, entities, and any other various aspects of an organizational data management system in a utility application or otherwise using a custom computer language provided by the organizational data management system.

In an embodiment, other apps may include, for example, any types of applications that may be used by individuals and/or organizations. The other apps may include, for example, any other category of integration applications and/or any other types of applications that can be executed by a computing system or device.

In an embodiment, authorized users of an organization with the appropriate privileges may access one or more services of the application store computing system directly, for example, via a website, web page, desktop application, mobile application, and/or any other type of application to browse, view, search, compare, evaluate, download, install, configure, upgrade, uninstall, and/or perform any other types of activities associated with the integration applications or any other types of applications provided via the application store computing system. In some embodiments, authorized users of an organization with the appropriate privileges may access one or more services of the application store computing system indirectly, for example, through another application (e.g., application 312) and/or another computing system (e.g., computing system 310). In some embodiments, the application store computing system can be provided on the same computing system with other applications and services (e.g., running on computing system 310).

In an embodiment, any one or more users of an organization, such as an administrator, manager, or one or more other users associated with a particular role and/or one or more particular privileges each may install and/or configure each of one or more different integration applications for use by the organization. For example, any such user with the appropriate privileges may install one or more of the integration applications for the organization on the computing system 310 or any other computing systems or devices. Also, any such user with the appropriate privileges may configure integration data 314 associated with each of one or more integration applications. In some embodiments, one user with the appropriate privileges may delegate authority to one or more other users to perform installation and/or configuration of one or more of the integration applications for an organization.

In an embodiment, an organizational data management system is provided via at least one computing system to allow each of one or more different organizations to centrally manage their own organizational data 311. For example, the organizational data management system can be provided as a centralized system of record for storing and managing various types of organizational data 311 of an organization. The organizational data management system also can provide various types of integration across different third-party applications that utilize, that perform processing involving or based on, and/or that are otherwise associated with organizational data 311. The organizational data management system also can automate various processing based on the organizational data 311 including, but not limited to the automation of processing performed across various third-party applications based on the organizational data 311. In various embodiments, the organizational data management system can be provided via one or more different computing systems, one or more different applications, and/or via one or more different services, for example, to one or more different organizations over a computer network.

In an embodiment, a separate instance of an organizational data management system generally can be provided to each of one or more different organizations, for example, to allow each organization to independently configure, manage, and integrate their own instance of an organizational data management system, and to secure and insulate organizational data 311 from outside parties. For example, separate instances of an organizational data management system generally may be provided to different organizations using different computer hardware devices, different software applications, different instances of software applications running in an isolated space, different databases, physically partitioned databases, and/or in various other ways.

In an embodiment, an organizational data management system generally enables organizations to efficiently manage organizational data 311 and associated processing that occurs based on the organizational data 311. For example, an organizational data management system may be used as a centralized system of record that is integrated with other computing systems and applications (e.g., third-party applications) that generate, utilize, process, or perform activities based on organizational data 311. Such integration generally allows an organizational data management system to orchestrate and automate processing of organizational data 311 and associated activities across numerous different applications that are not in communication with one another. In some embodiments, an organizational data management system can allow appropriate users (e.g., authenticated, authorized, privileged, etc.) of an organization to, for example, manage organization information, settings of an organizational data management system, onboarding of employees, offboarding of employees, employee information, organizational structure and locations, employee placement in departments and teams, workflows and tasks, reports, documents, and/or any other information associated with organizational data 311.

In an embodiment, an organization uses an organizational data management system that allows the organization to manage organizational data 311 and activities performed based on the organizational data 311. In some embodiments, an organization can install and use an organizational data management system on a computing system (e.g., computing system 310 or any other computing system) that is dedicated to the organization. Also, an organizational data management system can comprise any one or more of organizational data 311, application(s) 312, application policy data 313, integration data 314, data structures 315, cloud development environment 316, custom language processing engine 317, computer instruction compiler 318, computer instruction generator 319, and/or any other information associated with managing, processing, and performing activities associated with organizational data 311. In addition, an organizational data management system may provide and utilize its own custom computer language that allows business users to access and perform various operations using simplified computer instructions based on structure of organizational data 311. Further, an organizational data management system may perform multilayered generation and processing of computer instructions to perform various activities based on the custom computer language.

In an embodiment, an organizational data management system may be provided by another party for use by an organization. For example, another party such as a software application provider may host or otherwise provide a separate instance of an organizational data management system to each of one or more different organizations allowing each organization to independently manage their own organizational data 311. In such embodiments, each separate instance of an organizational data management system provided to an organization can respectively comprise any one or more organizational data 311, application(s) 312, application policy data 313, integration data 314, data structures 315, and/or any other information associated with managing, processing, and performing activities associated with organizational data 311 for the particular organization. As such, an organizational data management system may be a cloud-based platform that maintains organizational data 311 and other information associated with each of one or more different organizations and that allows each of the different organizations to independently manage their own respective organizational data 311 and related processes independently from any other organization.

Figure 4:
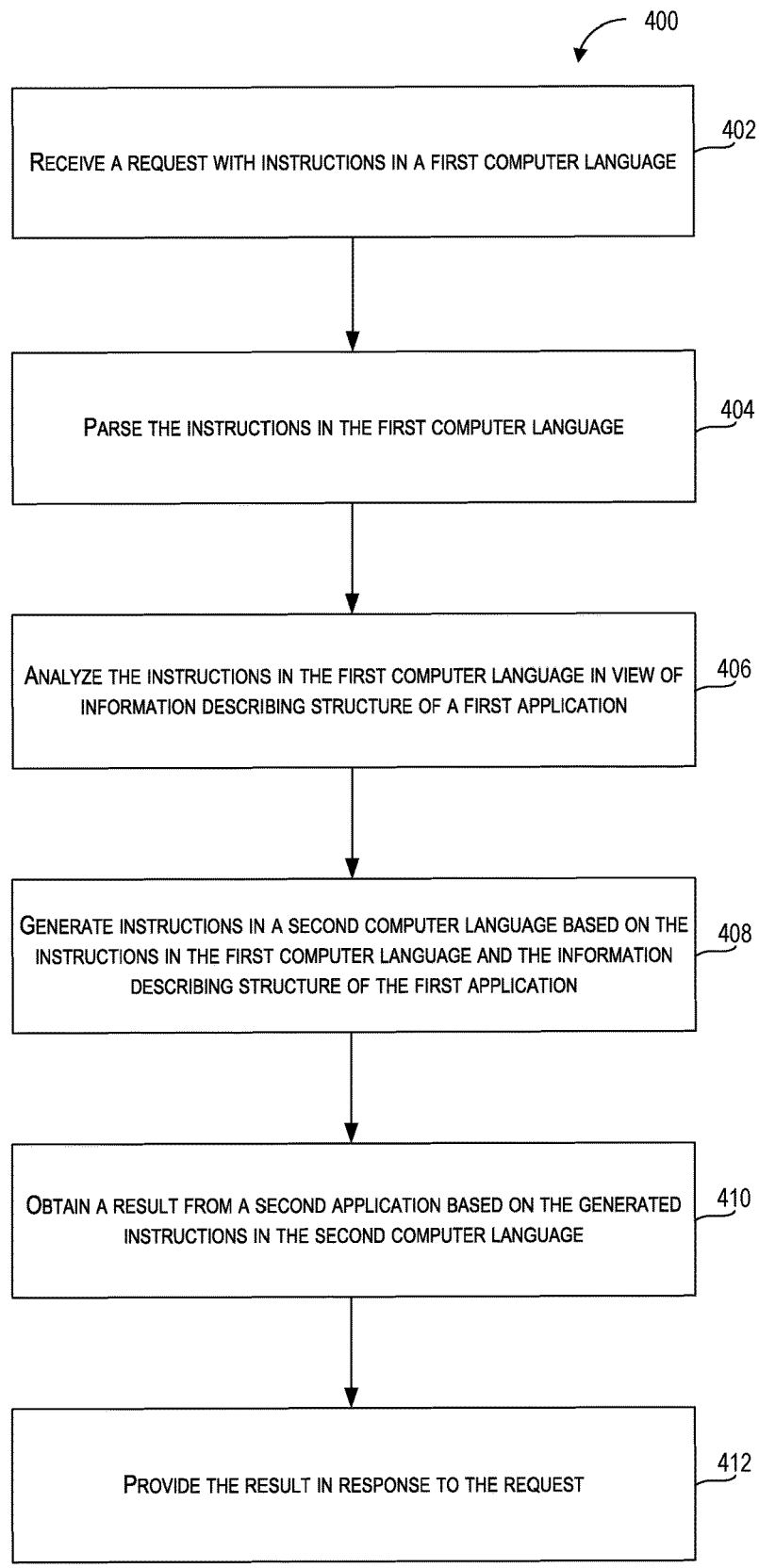
FIG. 4 depicts a flow diagram of an example method for performing multilayered generation and processing of computer instructions, according to example embodiments of the present disclosure.

FIG. 4 depicts a flow diagram of an example method 400 for performing multilayered generation and processing of computer instructions, according to example embodiments of the present disclosure. One or more portions of the method 400 can be executed and/or implemented on one or more computing devices or computing systems including, for example, the computing system 110, the remote computing system 130, the one or more computing devices 152, the computing device 200, the computing system 302, the computing system 306, and/or the computing system 310. In addition, one or more portions of the method 400 can be executed or implemented as an algorithm on the hardware devices or systems disclosed herein. FIG. 4 depicts steps performed in a particular order for purposes of illustration and discussion. As such, those of ordinary skill in the art, using the disclosures provided herein, will understand that various steps of any of the methods disclosed herein can be adapted, modified, rearranged, omitted, and/or expanded without deviating from the scope of the present disclosure.

At 402, a computer system receives a request with instructions in a first computer language. In an embodiment, a custom language processing engine 317 of a computing system (e.g., computing system 310) receives a request having one or more instructions in a custom computer language. For example, the request may be received from an application (e.g., application 304, application 308, application 312), application development environment 305, cloud application development environment 309, cloud development environment 316, etc. In various examples, the instructions can be associated with a custom computer language that generally may represent or otherwise be associated with a simplified set of computer instructions that align with or match a functional or business environment, such as an organization, business, industry, sector, etc. For example, the instructions in the custom computer language may be associated with or based on one or more of structure of organizational data 311, structure of one or more applications providing organizational data 311, and/or structure of an organizational data management system that stores and manages organizational data 311 as a system of record for an organization. Further, the custom computer language generally can allow users to use custom computer instructions based on natural structure and relationships of organizational data 311 in terms that are familiar to the users without needing knowledge of a complex computer programming language, without being dependent on computer programmers, without being aware of or needing to know the complexity of underlying data organization or storage, without needing to understand, implement, and/or maintain a complex web of join conditions across various sets of underlying data, etc.

In an embodiment, instructions in a custom computer language are associated with one or more applications associated with an organizational data management system. For example, one or more applications may support or provide a custom computer language for use by users. In one example, an organizational data management system and associated applications generally provide and support a custom computer language associated with organizational data 311. For example, a custom computer language based on organizational data generally may allow users to provide instructions in the custom computer language, for example, to define, modify, execute, and/or otherwise implement custom queries, reports, policies, workflows, rules, triggering conditions, and/or other functionality and operations using the custom computer language. As such, instructions in a custom computer language associated with organizational data 311 of an organizational data management system generally may be received in association with any one or more of ad hoc custom user queries, user generated reports, stored reports, user generated actions, activated policies, stored policies, activated workflows, stored workflows, rules associated with activated triggering conditions, and/or any other processes or procedures defined and/or otherwise specified based on instructions in a custom computer language associated with an organizational data management system.

At 404, a computer system parses the instruction in the first computer language. In an embodiment, the computer instruction compiler 318 of a computing system (e.g., computing system 310) receives and processes one or more instructions in a custom computer language. For example, the computer instruction compiler 318 can be configured to process instructions in a custom computer language based on the structure of organizational data 311 and/or applications and systems that provide organizational data 311. In an embodiment, the computer instruction compiler 318 utilizes one or more data structures 315 associated with organizational data 311 of an organizational data management system when analyzing and/or processing one or more instructions in a custom computer language (e.g., a custom computer language based on the organizational data 311).

In an embodiment, the computer instruction compiler 318, can perform operations associated with analyzing instructions in a custom computer language which may include, but are not limited to, analyzing and parsing custom computer language instructions based on one or more rules associated with the custom computer language (e.g., which may include one or more rules based on data structures 315 associated with organizational data 311). For example, the computer instruction compiler 318 may use rules associated with the custom computer language and/or associated data structures 315 to check syntax, logic, and/or other aspects of instructions in a custom computer language to determine whether errors exist in the instructions, to identify errors in the instructions, to return information about any errors in the instructions, to determine when the instructions are error free, etc.

At 406, a computer system analyzes the instructions in the first computer language in view of information that describes structure of a first application. In an embodiment, the computer instruction generator 319 of a computing system (e.g., computing system 310) receives and processes one or more instructions in a custom computer language. For example, the computer instruction generator 319 may analyze instructions in the custom computer language based on one or more data structures 315 associated with organizational data 311 and/or any application or system associated with organizational data 311. In some embodiments, the computer instruction generator 319 analyzes custom computer language instructions and determines one or more operations to include in additional instructions that are to perform or otherwise carry out tasks specified by the custom computer language instructions.

In an embodiment the computer instruction generator 319 can identify one or more unspecified data joins and/or other operations in custom computer language instructions associated with organizational data 311 based on analyzing data structures 315 associated with the organizational data 311. For example, the computer instruction generator 319 can analyze data (e.g., organizational data 311) and operations (e.g., operations involving organizational data 311 specified by custom computer language instructions and evaluate such data and operations against data structures 315 (e.g., one or more object graph data structures 315 associated with organizational data 311). Based on the evaluation, the computer instruction generator 319 can determine one or more operations for performing the actions specified by the custom computer language instructions on one or more other applications and/or systems. For example, the computer instruction generator 319 generally may take high-level business user instructions in a custom computer language based on organizational data 311, analyze those instructions against one or more data structures 315 that describe the organizational data 311, determine from the one or more data structures 315 one or more operations (e.g., explicit joins, implicit joins, virtual joins, and/or any other operations that may or may not be specified in the high-level instructions) that are needed to perform one or more actions specified by the high-level instructions against other applications, systems, and/or data stores. In addition, the computer instruction generator 319 then may use the determined operations to generate instructions in another computer language to carry out the actions specified in the high-level instructions against one or more other applications, systems, and/or data stores.

At 408, a computer system generates instructions in a second computer language based on the instructions in the first computer language and the information describing structure of the first application. In an embodiment, the computer instruction generator 319 of a computing system (e.g., computing system 310) generates instructions in a different computer language based on instructions received in a custom computer language. For example, the computer instruction generator 319 can generate new instructions in a different computer language for execution in association with another application, system, and/or data store based on analyzing custom computer language instructions in view of one or more data structures 315. In some embodiments, the computer instruction generator 319 identifies one or more operations that are specified and/or unspecified in the custom computer language instructions based on examining such instructions in view of the data structures 315. For example, the computer instruction generator 319 may identify one or more explicit and/or implicit data join conditions to include in generated instructions based on analyzing examining data structures 315 in view of instructions in an associated custom computer language. As such, the computer instruction generator 319 generally may provide one or more operations and/or join conditions that otherwise were unspecified in custom computer language instructions. In some examples, the computer instruction generator 319 translates instructions from a custom computer language to a programming language or other type of computer language (e.g., a standard or proprietary data access language) to perform actions specified by instructions in a custom computer language.

At 410, a computer system obtains a result from a second application based on the generated instructions in the second computer language. In an embodiment, the custom language processing engine 317 of a computing system (e.g., computing system 310) provides one or more new instructions generated from instructions in a custom computer language to one or more other applications (e.g., applications 312), systems (e.g., computing systems 320), and/or data stores (e.g., data store 330, 340, 350) for execution. For example, the one or more generated instructions may be provided to obtain information and/or to perform one or more actions specified in the original instructions in the custom computer language. In some embodiments, new instructions in a programming language and/or data access language (e.g., structured query language (SQL)) generated from instructions in a custom computer language are provided to a database application to obtain information from one or more data stores (e.g., data store 330, 340, 350). For example, the generated instructions may be used to obtain information associated with and to respond to a request based on the original instructions in the custom computer language.

At 412, a computer system provides a result in response to the request. In an embodiment, the custom language processing engine 317 of a computing system obtains a result from each of one or more applications (e.g., applications 312), systems (e.g., computing systems 320), and/or data stores (e.g., data store 330, 340, 350). For example, the custom language processing engine 317 generally may receive, analyze, and process organizational data 311 received from any one or more applications, systems, and/or data stores. In some embodiments, such organizational data 311 may be returned in response to an associated request that included instructions in a custom computer language. In some examples, the organizational data 311 may be further processed in association with one or more applications of an organizational data management system before a result is returned in response to a request. For example, organizational data 311 may be returned from another application, system, and/or data store and then further processed based on one or more queries, reports, policies, workflows, triggering conditions, rules, custom field definitions, and/or any other functionality and operations provided by an organizational data management system before returning a result in response to a request.

Figure 5:
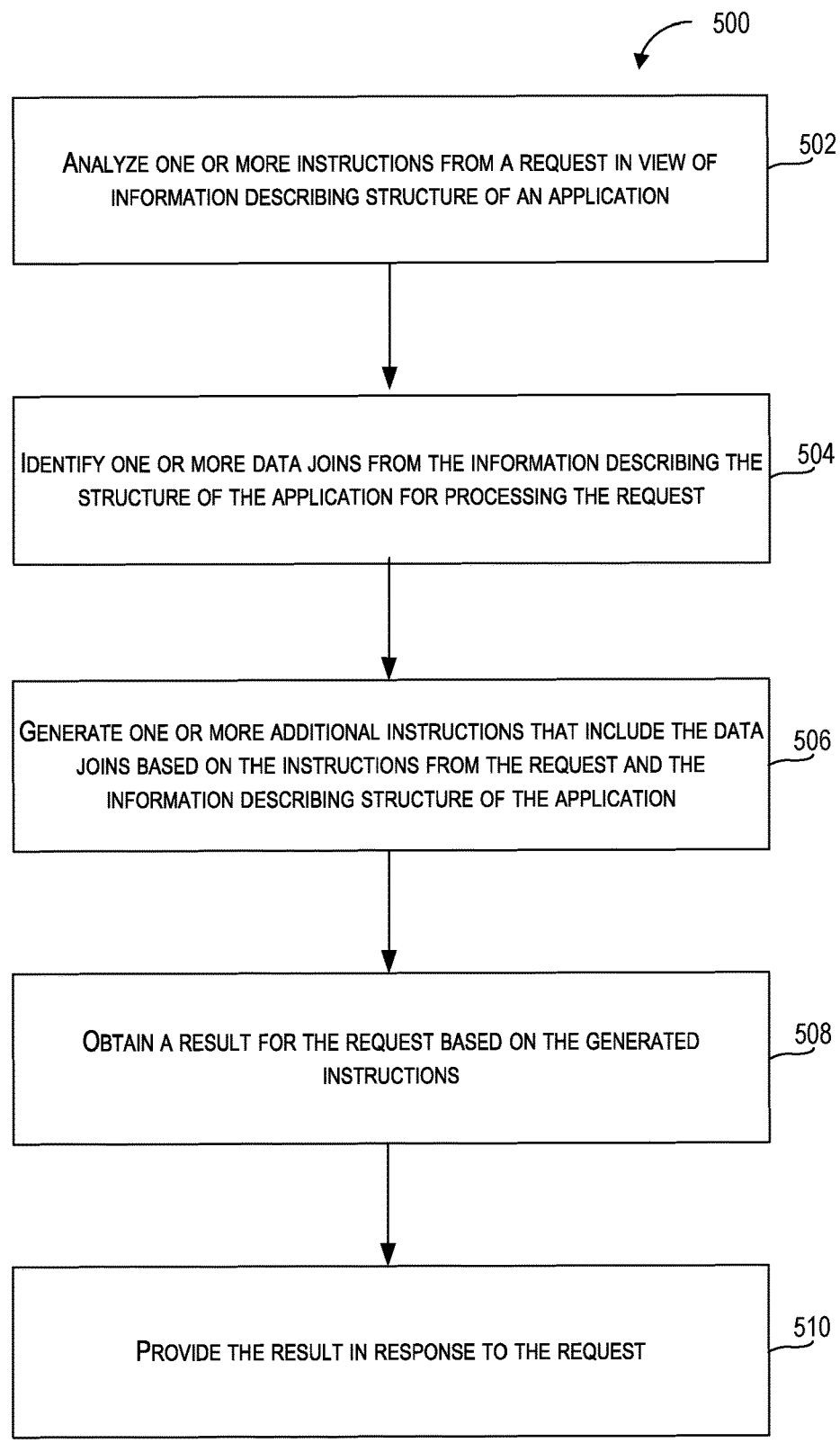
FIG. 5 depicts a flow diagram of an example method for performing multilayered generation and processing of computer instructions, according to example embodiments of the present disclosure.

FIG. 5 depicts a flow diagram of an example method 500 for performing multilayered generation and processing of computer instructions, according to example embodiments of the present disclosure. One or more portions of the method 500 can be executed and/or implemented on one or more computing devices or computing systems including, for example, the computing system 110, the remote computing system 130, the one or more computing devices 152, the computing device 200, the computing system 302, the computing system 306, and/or the computing system 310. In addition, one or more portions of the method 500 can be executed or implemented as an algorithm on the hardware devices or systems disclosed herein. FIG. 5 depicts steps performed in a particular order for purposes of illustration and discussion. As such, those of ordinary skill in the art, using the disclosures provided herein, will understand that various steps of any of the methods disclosed herein can be adapted, modified, rearranged, omitted, and/or expanded without deviating from the scope of the present disclosure.

At 502, a computer system analyzes one or more instructions from a request in view of information describing structure of an application. In an embodiment, a computer instruction generator 319 of a computing system (e.g., computing system 310) analyzes instructions in a custom computer language based on a request. For example, such instructions may be received in association with a request as described at 402 and elsewhere in the present disclosure. Such instructions also may be parsed as described at 404 and elsewhere in the present disclosure.

In some embodiments, the instructions in the custom computer language are associated with organizational data 311 or an organizational data management system. In some embodiments, the instructions in the custom computer language generally may specify a simplified function (e.g., employee.devices.lastPing, employee.devices.lastUpdate) to obtain data associated based on multiple different entities and relationships present in organizational data 311 without specifying data joins and/or other underlying operations. In some embodiments, the instructions in the custom computer language generally may specify a list of one or more data fields of a report (e.g., employee.name, manager.name, department.name, devices.type, devices.age, etc.) without specifying data joins and/or other underlying operations needed to access and/or retrieve the associated underlying data.

In an embodiment, a computer instruction generator 319 analyzes one or more instructions in a custom computer language that is based on organizational data 311 in view of information that describes structure and relationships associated with the organizational data 311. For example, the computer instruction generator 319 may analyze such instructions based on one or more data structures 315 associated with one or more applications used in providing an organizational data management system for managing organizational data 311. In some embodiments, one or more of the data structures are object graph data structures 315 that may include various information describing entities, relationships, metadata, explicit joins, virtual joins, and/or any other information used to describe structure of organizational data 311 associated with an application.

In some embodiments, the computer instruction generator 319 analyzes one or more instructions in a custom computer language and determines one or more portions of an object graph data structure to access in association with the instructions. For example, the computer instruction generator 319 may analyze a master object graph data structure associated with organizational data 311 and determine one or more portions of the object graph data structure that are relevant for processing instructions in the custom computer language. The computer instruction generator 319 then can access the relevant portions of the object graph data structure to process the instructions in the custom computer language. As such, the computer instruction generator 319 is able to optimize processing associated with object graph data structures, which generally can include any number of entries (e.g., 1, 10, 100, 1000, 10000, etc.)

In an embodiment, the computer instruction generator 319 analyzes instructions in a custom computer language based on one or more object graph data structures 315. For example, the computer instruction generator 319 may analyze instructions in a custom computer language that are based on one or more data structures 315 associated with organizational data 311 and/or any application or system associated with organizational data 311. In some embodiments, the computer instruction generator 319 analyzes custom computer language instructions and determines one or more operations to include when generating additional instructions that are to perform or otherwise carry out underlying tasks specified by higher-level, custom computer language instructions.

At 504, a computer system identifies one or more data joins from the information describing the structure of the application for processing the request. In an embodiment, the computer instruction generator 319 of a computing system (e.g., computing system 310) identifies one or more data joins and/or other operations based on analyzing the data structures 315, where such data joins and/or other operations are unspecified and absent from instructions in a custom computer language. In addition, the computer instruction generator 319 then may use the identified data joins and/or operations when generating instructions in another computer language to carry out one or more actions specified by custom computer language instructions. For example, a custom computer language may provide a high-level interface that allows users with functional business knowledge to utilize a simplified set of instructions for performing various operations associated with organizational data 311. Such high-level interfaces may allow users simply to request data that is needed and/or to perform various operations without including specific details about complex, underlying data structures and distributed systems and third-party applications associated with organizational data. As such, the computer instruction generator 319 generally can determine the underlying data joins (e.g., any number of explicit joins, any number of virtual joins, etc.) and/or any other operations that are needed to carry out instructions specified in a custom computer language against one or more unrelated application, systems, and/or data stores based on analyzing the associated data structures 315 describing the structure and relationships of various organizational data 311. For example, data joins may be determined based on explicit relationships defined in an object graph and/or virtual or implicit relationships defined in an object graph (e.g., between entities and/or data fields). In various examples, analyzing the data structures 315 greatly simplifies the task of determining the appropriate data sources and data objects that are to be used to obtain the organizational data 311 and/or to perform actions involving organizational data 311. For example, accessing the data structures 315 generally optimizes the determination of relevant data objects (e.g., tables) and relationships, which generally can become quite large in various types of computer systems (e.g., 100's, 1000's, 10,000's, and/or generally any number of data objects and corresponding to organizational data and/or any other type of data.

At 506, a computer system generates one or more additional instructions that include the data joins based on the instructions from the request and the information describing the structure of the application. In an embodiment, the computer instruction generator 319 of a computing system (e.g., computing system 310) generates instructions (e.g., in the custom computer language) that include one or more data joins or other operations that were identified based on analyzing instructions in a custom computer language in view of in one or more data structures 315 that describe structure and relationships associated with the organizational data 311 and/or associated applications and systems. In some embodiments, the computer instruction generator 319 may generate new instructions in the custom computer language or a variant thereof (e.g., an intermediate language that is executable in a runtime environment), which may be executed by one or more applications, computing systems, and/or data stores to perform operations. In some embodiments, the computer instruction generator 319 generates new instructions in the custom computer language and/or modifies or enhances instructions received in the custom computer language to specify one or more new or additional data joins and/or other operations that were not present in an original version of custom computer language instructions. For example, the computer instruction generator 319 may generate or update instructions in a custom computer language based on instructions received in the custom computer language to allow processing by one or more applications and/or an organizational data management system, which support and execute instructions in the custom computer language. Further, such instructions generated in the custom computer language then may be executed to perform one or more operations associated with organizational data 311. In some examples, the instructions generated in the custom computer language may then be used to further generate instructions in one or more other computer languages for execution to perform various operations.

In an embodiment, the computer instruction generator 319 generates instructions in a different computer language, other than the custom computer language, based on instructions in the custom computer language. For example, the computer instruction generator 319 can generate instructions in a different computer language that include one or more data joins or other operations that were unspecified by instructions in a custom computer language and were otherwise identified based on analyzing such instructions in view of in one or more data structures 315 describing structure and relationships of organizational data 311 and/or associated applications and systems. The instructions generated in the different computer language then may be executed in association with another application, system, and/or data store to perform one or more downstream operations in association with processing a request based on instructions in the custom computer language.

At 508, a computer system obtains a result for the request based on the generated instructions. In an embodiment, a custom language processing engine 317 of a computing system (e.g., computing system 310) provides one or more generated instructions (based on one or more instructions in a custom computer language) to one or more other applications (e.g., applications 312), systems (e.g., computing systems 320), and/or data stores (e.g., data store 330, 340, 350) for execution. For example, the generated instructions may be used to obtain information and/or to perform one or more procedures or actions with other applications, systems, and/or data stores that do not support the custom computer language. In some embodiments, instructions generated in a different computer language may be generated based on instructions in a custom computer language and supplemental information obtained from one or more data structures 315 associated with organizational data 311. In addition, generated instructions may be generated, for example, in any one or more different computer languages (e.g., any programming language, any data access language, and/or any other type of computer language) other than a custom computer language provided for use by users with functional business knowledge. In various embodiments, generated instructions can be used to obtain information from other applications, systems, and/or data stores in association with the processing of a request with instructions in a custom computer language.

At 510, a computer system provides the result in response to the request. In an embodiment, the custom language processing engine 317 of a computing system obtains a result from each of one or more applications (e.g., applications 312), systems (e.g., computing systems 320), and/or data stores (e.g., data store 330, 340, 350) based on the generated instructions. In various examples, the custom language processing engine 317 generally may receive, analyze, and process organizational data 311 and/or other information received from any one or more applications, systems, and/or data stores. In an embodiment, a result comprising organizational data 311, other information, acknowledgement that one or more operations were performed, and/or any other type of result may be returned in response to a request with instructions in a custom computer language. In some examples, organizational data 311 may be further processed in association with one or more applications of an organizational data management system before a result is returned in response to a request. For example, organizational data 311 may be returned from one or more applications, systems, and/or data stores and then further processed based on one or more queries, reports, policies, workflows, triggering conditions, rules, and/or any other functionality and/or operations provided by an organizational data management system before providing a result in response to a request that includes instructions in a custom computer language.

Figure 6:
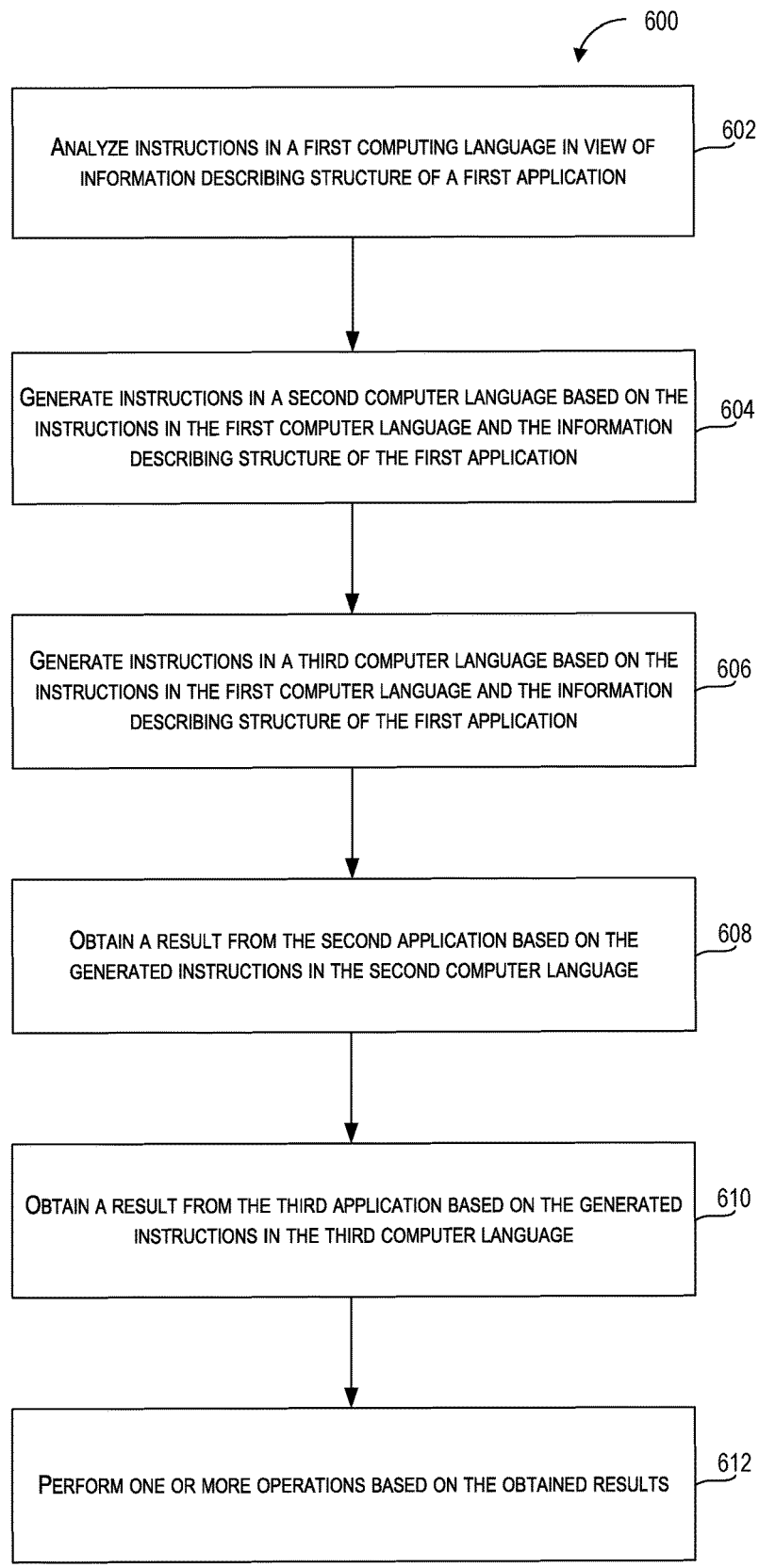
FIG. 6 depicts a flow diagram of an example method for performing multilayered generation and processing of computer instructions, according to example embodiments of the present disclosure.

FIG. 6 depicts a flow diagram of an example method 600 for performing multilayered generation and processing of computer instructions, according to example embodiments of the present disclosure. One or more portions of the method 600 can be executed and/or implemented on one or more computing devices or computing systems including, for example, the computing system 110, the remote computing system 130, the one or more computing devices 152, the computing device 200, the computing system 302, the computing system 306, and/or the computing system 310. In addition, one or more portions of the method 600 can be executed or implemented as an algorithm on the hardware devices or systems disclosed herein. FIG. 6 depicts steps performed in a particular order for purposes of illustration and discussion. As such, those of ordinary skill in the art, using the disclosures provided herein, will understand that various steps of any of the methods disclosed herein can be adapted, modified, rearranged, omitted, and/or expanded without deviating from the scope of the present disclosure.

At 602, a computer system analyzes instructions in a first computing language in view of information that describes structure of a first application. In an embodiment, a computer instruction generator 319 of a computing system (e.g., computing system 310) analyzes instructions in a custom computer language that are associated with a request. For example, such instructions may be received in association with a request as described at 402 and elsewhere in the present disclosure. Such instructions also may be parsed as described at 404 and elsewhere in the present disclosure. In an embodiment, a computer instruction generator 319 analyzes one or more instructions in a custom computer language based on organizational data 311 in view of information that describes structure and relationships associated with the organizational data 311.

In an embodiment, the computer instruction generator 319 analyzes instructions in a custom computer language based on one or more data structures 315 associated with organizational data 311 and/or any application or system associated with organizational data 311. In various embodiments, the computer instruction generator 319 determines, based on the analyzing, one or more data joins and/or other operations to include when generating additional instructions that are to perform or otherwise carry out tasks specified by custom computer language instructions with other applications, computing systems, and/or data stores. In various embodiments, the computer instruction generator 319 generates instructions in each of one or more computer languages based on analyzing instructions received in a custom computing language associated with organizational data 311 in view of one or more object graph data structures 315 describing structure of the organizational data 311.

At 604, a computer system generates instructions in a second computer language based on the instructions in the first computer language and the information that describes the structure of the first application. In an embodiment, the computer instruction generator 319 of a computer system (e.g., computer system 310) generates instructions in a second computer language based on instructions received in the custom computer language. For example, the computer instruction generator 319 can generate instructions in a different computer language for execution with another application, system, and/or data store based on analyzing instructions of a custom computer language in view of one or more data structures 315. In various embodiments, the instructions generated in the second computing language by computer instruction generator 319 include one or more data joins and/or one or more other types of operations identified based on analyzing instructions of a custom computer language in view of one or more data structures 315.

In an embodiment, the computer instruction generator 319 determines one or more data joins and/or other operations to include when generating instructions in the second computing language based on analyzing instructions in a custom computer language (e.g., a custom computer language based on organizational data 311) in view of one or more data structures 315 (e.g., one or more object graph data structures describing the organizational data 311). For example, the computer instruction generator 319 generally may identify one or more explicit data joins, one or more virtual data joins, and/or one or more other types of operations present in or otherwise ascertainable from the one or more object graph data structures 315. For example, such data joins and/or other types of operations generally may be unspecified or absent in high-level custom computer language instructions, but otherwise may be included in associated instructions being generated to perform associated lower-level operations across one or more different applications, computing systems, and/or data stores.

At 606, a computer system generates instructions in a third computer language based on the instructions in the first computer language and the information that describes the structure of the first application. In an embodiment, the computer instruction generator 319 of a computer system (e.g., computer system 310) generates instructions in a third computer language based on instructions received in the custom computer language. For example, the computer instruction generator 319 can generate instructions in a third computer language for execution with another application, system, and/or data store based on analyzing instructions of a custom computer language in view of one or more data structures 315. In various embodiments, the instructions generated in the third computing language by computer instruction generator 319 include one or more data joins and/or one or more other types of operations identified based on analyzing instructions of a custom computer language in view of one or more data structures 315.

In an embodiment, the computer instruction generator 319 determines one or more data joins and/or other operations to include when generating instructions in the third computing language based on analyzing instructions in a custom computer language (e.g., a custom computer language based on organizational data 311) in view of one or more data structures 315 (e.g., one or more object graph data structures describing the organizational data 311). For example, the computer instruction generator 319 generally may identify one or more explicit data joins, one or more virtual data joins, and/or one or more other types of operations present in or otherwise ascertainable from the one or more object graph data structures 315. For example, such data joins and/or other types of operations generally may be unspecified or absent in high-level custom computer language instructions, but otherwise may be included in associated instructions being generated to perform associated lower-level operations across one or more different applications, computing systems, and/or data stores. In various examples, the instructions generated in the third computer language include one or more data joins and/or one or more other types of operations that are different from one or more data joins and/or one or more other types of operations included in the instructions generated in the second computer language.

At 608, a computer system obtains a result from the second application based on the generated instructions in the second computer language. In an embodiment, a custom language processing engine 317 of a computing system (e.g., computing system 310) obtains one or more results based on the instructions generated in the second language. For example, the custom language processing engine 317 may execute the instructions generated in the second computer language or provide such instructions to one or more other applications (e.g., applications 312), systems (e.g., computing systems 320), and/or data stores (e.g., data store 330, 340, 350) for execution. As such, the custom language processing engine 317 can receive or otherwise obtain one or more results based on execution of the instructions generated in the second computer language.

At 610, a computer system obtains a result from the third application based on the generated instructions in the third computer language. In an embodiment, a custom language processing engine 317 of a computing system (e.g., computing system 310) obtains one or more results based on the instructions generated in the language. For example, the custom language processing engine 317 may execute the instructions generated in the computer language or provide such instructions to one or more other applications (e.g., applications 312), systems (e.g., computing systems 320), and/or data stores (e.g., data store 330, 340, 350) for execution. As such, the custom language processing engine 317 can receive or otherwise obtain one or more results based on execution of the instructions generated in the second computer language.

At 612, a computer system performs one or more operations based on the obtained results. In an embodiment, the custom language processing engine 317 of a computing system (e.g., computing system 310) performs one or more operations based on one or more results obtained at 608, 610, and/or as otherwise provided in the present disclosure. In an example, the custom language processing engine 317 provides one or more results obtained from execution of the computer instructions generated in the second computer language and/or one or more results obtained from execution of the computer instructions generated in the third computer language in response to a request comprising instructions in a custom computer language. In various examples, the custom language processing engine 317 generally may receive, analyze, and process organizational data 311 and/or other information received from any one or more applications, systems, and/or data stores. In an embodiment, a result comprising organizational data 311, other information, acknowledgement that one or more operations were performed, and/or any other type of result may be returned in response to a request with instructions in a custom computer language.

In an embodiment, the custom language processing engine 317 processes organizational data 311 obtained based on the instructions generated in the second computer language and/or organizational data 311 obtained based on the instructions generated in the third computer language (e.g., individually or in combination). For example, organizational data 311 may be further processed in association with one or more applications of an organizational data management system before a result is returned in response to a request. In some embodiments, organizational data 311 may be processed based on one or more queries, reports, policies, workflows, triggering conditions, rules, and/or any other functionality and/or operations provided by an organizational data management system, for example, based on instructions in a custom computer language.

Numerous details are set forth in the foregoing description. However, it will be apparent to one of ordinary skill in the art having the benefit of this disclosure that the present disclosure may be practiced without these specific details. In some instances, structures and devices are shown in block diagram form, rather than in detail, to avoid obscuring the present disclosure.

Some portions of the detailed description have been presented in terms of processes and symbolic representations of operations on data bits within a computer memory. Here, a process can include a self-consistent sequence of steps leading to a result. The steps can include those requiring physical manipulations of physical quantities. These quantities can take the form of electrical or magnetic signals capable of being stored, transferred, combined, compared, and otherwise manipulated. These signals can be referred to as bits, values, elements, symbols, characters, terms, numbers, or the like.

These terms and similar terms can be associated with physical quantities and can represent labels applied to these quantities. The terms including "obtaining," "parsing," "analyzing," "accessing," "determining," "identifying," "adjusting," "modifying," "transmitting," "receiving," "processing" "generating," or the like, can refer to the actions and processes of a computer system, a computing device, or similar electronic computing device, that manipulates and transforms data represented as physical (e.g., electronic) quantities within the computer system's registers and memories into other data that can be similarly represented as physical quantities within the computer system's memories, registers, or other information storage device, data transmission device, or data processing device.

Certain examples of the present disclosure can relate to an apparatus for performing the operations described herein. This apparatus may include a computing device that is activated or reconfigured by a computer program comprising electronic instructions stored in the computing device. Such a computer program may be stored in a computer readable storage medium, which can include any type of storage. For example, the storage can include hard disk drives, solid state drives, floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The above description is intended to be illustrative, and not restrictive. The scope of the disclosure can therefore be determined with reference to the claims.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer system that implements an organizational management platform that controls and leverages organizational data to manage organizational applications for an organization, the computer system comprising:
one or more processors; and
one or more databases that collectively store a set of organizational data associated with the organization, wherein the set of organizational data comprises an object graph data structure comprising a plurality of employee data objects that respectively correspond to a plurality of employees of the organization, and wherein the set of organizational data specifies organizational relationships between two or more of the employee data objects; and one or more non-transitory computer-readable media that collectively store instructions that, when executed by the one or more processors, cause the computer system to perform operations, the operations comprising:

receiving a user-defined query expression that is expressed in a first computer language, wherein the first computer language comprises a custom query language, and wherein the user-defined query expression contains one or more organization operators that return one or more of the employee data objects that have a specified organizational relationship with a specified employee data object within the set of organizational data;

incorporating the user-defined query expression into an automated data processing routine, wherein the automated data processing routine comprises one or more of a report, policy, workflow, trigger, or rule from an application; and implementing the automated data processing routine to modify at least one data object in the object graph data structure;

wherein implementing the automated data processing routine comprises translating the user-defined query expression from the first computer language into a second computer language, wherein the second computer language comprises a data access language, and wherein translating the user-defined query expression from the first computer language into the second computer language comprises evaluating the user-defined query expression against the set of organizational data to identify the one or more of the employee data objects that have the specified organizational relationship with the specified employee data object.

2. A computer-implemented method for performing processing of computer instructions, comprising:

receiving, by one or more processors, a request comprising one or more instructions in a first computer language associated with a first application, wherein the first application comprises a set of organizational data associated with an organization, wherein the set of organizational data comprises an object graph data structure comprising a plurality of employee data objects that respectively correspond to a plurality of employees of the organization, wherein the request comprises a user-defined query expression that is expressed in the first computer language, and wherein the user-defined query expression contains one or more organization operators that return one or more employee data objects that have a specified organizational relationship with a specified employee data object within the set of organizational data;

generating, by the one or more processors, one or more instructions in a second computer language different from the first computer language, the one or more instructions in the second computer language being generated based on the one or more instructions in the first computer language and information describing the object graph data structure of the first application, wherein generating the one or more instructions in the second computer language comprises evaluating, by the one or more processors, the user-defined query expression against the set of organizational data to identify the one or more of the employee data objects that have the specified organizational relationship with the specified employee data object;

obtaining, by the one or more processors, a result from a second application, the second application being a third-party application that is separate from the set of organizational data, the result comprising information based on the one or more instructions in the second computing language; and providing, by the one or more processors, the result in response to the request comprising one or more instructions in the first computer language.

3. The computer-implemented method of claim 2, further comprising:

accessing, by the one or more processors, the information describing the object graph data structure of the first application based at least in part on the one or more instructions in the first computer language.

4. The computer-implemented method of claim 2, further comprising:

determining, by the one or more processors, one or more portions of the information describing object graph data structure of the first application to access based at least in part on analyzing the one or more instructions in the first computer language.

5. The computer-implemented method of claim 2, further comprising:

providing, by the one or more processors, the one or more instructions in the second computing language to the second application.

6. The computer-implemented method of claim 2, further comprising:

processing, by the one or more processors, the result obtained from the second application, the result being associated with the one or more instructions in the second computing language.

7. The computer-implemented method of claim 2, further comprising:

generating, by the one or more processors, one or more instructions in a third computer language different from the first computer language and different from the second computer language, the one or more instructions in the third computer language being generated based on the one or more instructions in the first computer language and the information describing the object graph data structure of the first application.

8. The computer-implemented method of claim 7, further comprising:

providing, by the one or more processors, the one or more instructions in the third computing language to a third application.

9. The computer-implemented method of claim 8, further comprising:

obtaining, by the one or more processors, a second result from the third application, the second result comprising information based on the one or more instructions in the third computing language.

10. The computer-implemented method of claim 9, further comprising:

processing, by the one or more processors, the second result obtained from the third application, the second result being associated with the one or more instructions in the third computing language.

11. The computer-implemented method of claim 9, further comprising:
provided, by the one or more processors, the second result obtained from the third application in response to the request in the first computer language.

12. The computer-implemented method of claim 2, wherein the first computer language is a custom query language and the second computer language is a data access language.

13. The computer-implemented method of claim 2, further comprising:
determining, by the one or more processors, one or more data joins to include in the one or more instructions in the second computing language based on the one or more instructions in the first computer language, the one or more data joins being absent in the one or more instructions in the first computer language.

14. The computer-implemented method of claim 13, wherein the one or more data joins to include in the one or more instructions in the second computing language are determined based on the analyzing of the one or more instructions in the first computing language in view of the information describing the object graph data structure of the first application.

15. The computer-implemented method of claim 2, wherein the one or more instructions generated in the second computer language include one or more data joins based on the information describing the object graph data structure of the first application, the one or more data joins being absent in the one or more instructions in the first computer language.

16. The computer-implemented method of claim 2, wherein the request received in the first computer language is based on one or more of a report, policy, workflow, trigger, or rule from an application.

17. The computer-implemented method of claim 2, wherein the first application is associated with an organizational data management system.

18. A computer-implemented method for implementing an organizational management platform that controls and leverages organizational data to manage organizational applications for an organization, the method comprising:
maintaining, by a computing system comprising one or more computing devices, a set of organizational data associated with the organization, wherein the set of organizational data comprises an object graph data structure comprising a plurality of employee data objects that respectively correspond to a plurality of employees of the organization, and wherein the set of organizational data specifies organizational relationships between two or more of the employee data objects;
receiving, by the computing system, a user-defined query expression that is expressed in a first computer language, wherein the first computer language comprises a custom query language, and wherein the user-defined query expression contains one or more organization operators that return one or more of the employee data objects that have a specified organizational relationship with a specified employee data object within a set of organizational data;
incorporating, by the computing system, the user-defined query expression into an automated data processing routine, wherein the automated data processing routine comprises one or more of a report, policy, workflow, trigger, or rule; and
evaluating, by the computing system, the user-defined query expression against the set of organizational data to identify the one or more of the employee data objects that have the specified organizational relationship with the specified employee data object.

\* \* \* \* \*